United States Patent [19]

Camras

[11] 3,871,024

[45] Mar. 11, 1975

[54] VIDEO TRANSDUCER SYSTEM WITH MAGNETIC TRANSDUCER HEAD HAVING OUTPUT WINDING MEANS RESONANT AT A MID BAND RESONANCE FREQUENCY

[75] Inventor: Marvin Camras, Glencoe, Ill.

[73] Assignee: IIT Research Institute, Chicago, Ill.

[22] Filed: June 15, 1973

[21] Appl. No.: 370,534

Related U.S. Application Data

[60] Continuation of Ser. No. 165,660, July 23, 1971, abandoned, and a continuation-in-part of Ser. Nos. 344,075, Feb. 11, 1964, , and Ser. No. 848,992, Aug. 11, 1969, which is a division of Ser. No. 401,832, Oct. 6, 1964, Pat. No. 3,495,046, which is a continuation-in-part of Ser. No. 389,021, Aug. 12, 1964, Pat. No. 3,469,037.

[52] U.S. Cl. ........................ 360/33, 360/19, 360/65, 360/123

[51] Int. Cl. ........ H04n 5/78, G11b 5/20, G11b 5/44

[58] Field of Search ......... 360/65, 123, 124, 33, 19; 358/4, 8, 9

[56] References Cited

UNITED STATES PATENTS

| | | | |
|---|---|---|---|
| 2,876,296 | 3/1959 | Youngquest | 360/65 |
| 3,304,370 | 2/1967 | Johnson | 360/123 |
| 3,316,360 | 4/1967 | Coleman, Jr. | 360/65 |
| 3,340,367 | 9/1967 | Coleman, Jr. | 360/65 |
| 3,372,243 | 3/1968 | Schuller | 360/123 |

*Primary Examiner*—Raymond F. Cardillo, Jr.
*Attorney, Agent, or Firm*—Hill, Gross, Simpson, Van Santen, Steadman, Chiara & Simpson

[57] ABSTRACT

A wideband transducer system including longitudinally recorded video, transversely recorded or multiplexed audio, channel shifting during blanking intervals, high frequency bias synchronized to audio carrier frequency or otherwise selected to avoid beat notes, head with plural windings switched to reduce inductance during recording and connected for wideband playback into an amplifier input with comparable or higher impedance than that of the winding.

17 Claims, 16 Drawing Figures

FIG. 7
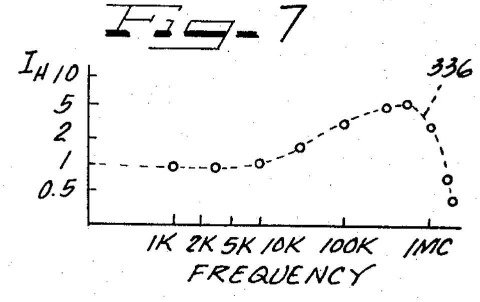
FIG. 9
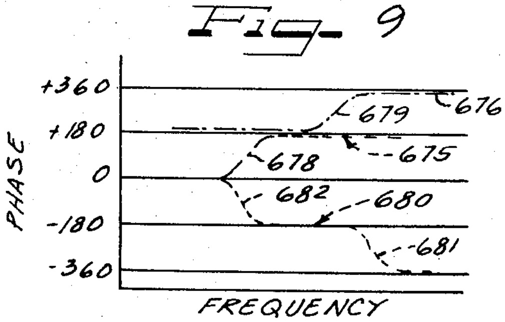
FIG. 8
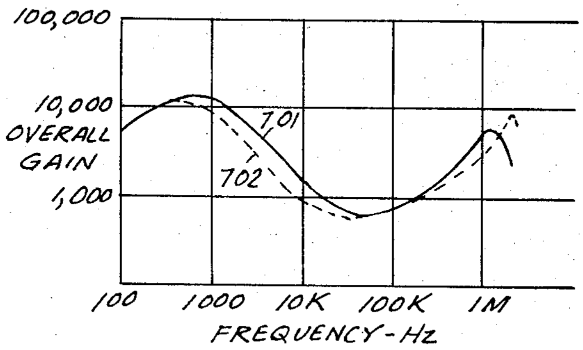
FIG. 9A
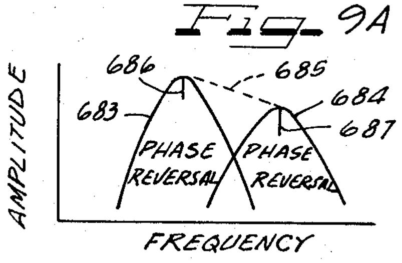
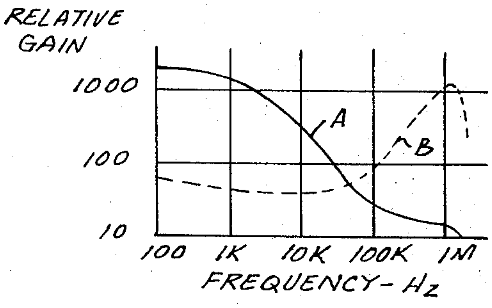
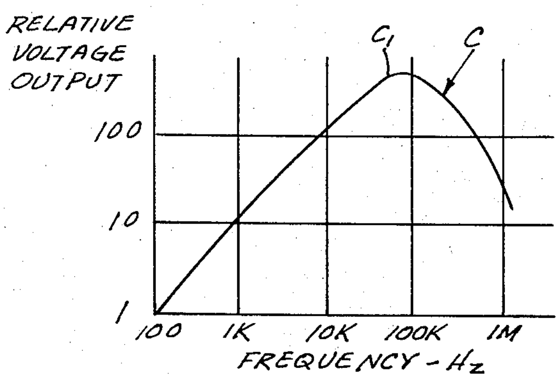
FIG. 8A FIG. 8B
INVENTOR.
MARVIN CAMRAS
BY Hill, Sherman, Meroni, Gross & Simpson ATTORNEYS

VIDEO TRANSDUCER SYSTEM WITH MAGNETIC TRANSDUCER HEAD HAVING OUTPUT WINDING MEANS RESONANT AT A MID BAND RESONANCE FREQUENCY

CROSS-REFERENCES TO RELATED APPLICATIONS

The present application is a continuation of my pending application Ser. No. 165,660, filed July 23, 1971 (now abandoned), and a continuation-in-part of my prior applications Ser. No. 344,075 filed Feb. 11, 1964, (now U.S. Pat. No. 3,681,526, issued Aug. 1, 1972) and Ser. No. 848,992 filed Aug. 11, 1969 (now abandoned); Ser. No. 848,992 is a division of my prior application Ser. No. 401,832 filed Oct. 6, 1964 (now U.S. Pat. No. 3,495,046 issued Feb. 10, 1970), which in turn is a continuation in part of my copending application Ser. No. 389,021 filed Aug. 12, 1964 (now U.S. pat. No. 3,469,037 issued Sept. 23, 1969).

SUMMARY OF THE INVENTION

This invention relates to a wideband magnetic transducer system and particularly to a video playback system wherein the playback head has a winding resonance frequency generally at the mid region of the essential frequency band of the system.

In accordance with the present invention, the system may transmit frequency components in an essential frequency band of at least four octaves, with a playback head winding resonance occurring at a mid band frequency which is at least two octaves below the essential upper frequency limit of the bandwidth. Further the resonance of the playback head winding is effectively utilized to enhance playback response by providing a playback amplifier whose input impedance is such that the amplifier input stage receives the characteristic enhanced head output in the region of the winding resonance, that is the input to the amplifier rises substantially as a function of frequency in the region of winding resonance.

As stated in my earliest application Ser. No. 344,075 filed Feb. 11, 1964 (of which the present application is a continuation in part); an early embodiment of the present invention is particularly concerned with a video recording and playback system wherein the record medium travels at relatively high speed and the video is recorded on a succession of narrow audio-video tracks extending lengthwise of the direction of travel of the record medium. Such embodiment in accordance with the present invention is capable of providing an hour or more of recording on a seven inch reel of ¼ inch wide magnetic record tape while avoiding the complexity and expense of a rotating type scanning head as has previously been employed commercially.

As set forth in said earliest application, the objects of the invention are as follows.

It is an object of the present invention to provide an economical video recording and/or playback system wherein the transducer head means scans longitudinally of the direction of movement of the record medium.

It is another object of the present invention to provide a longitudinal scan type video recording and/or playback system providing a relatively long playing time for a given length and width of a magnetic record medium.

Another object of the invention is to provide a video recording system providing reduced noise and which provides an improved picture quality on playback.

A further object of the present invention is to provide a novel magnetic transducer head construction for efficiently transducing both relatively low frequency signals and relatively high frequency signals.

Other objects, features and advantages of the present invention will be more fully apparent from the detailed description herein taken in connection with the accompanying drawings and from the following material incorporated herein by reference.

A particular object newly stated herein is to provide a wideband playback system operable to provide a relatively high output and improved signal to noise ratio, enabling the use of less amplification and/or narrower record tracks and/or shorter scanning gaps (with consequent higher packing densities).

BRIEF DESCRIPTION OF THE ACCOMPANYING DRAWINGS

Figures 1, 2:
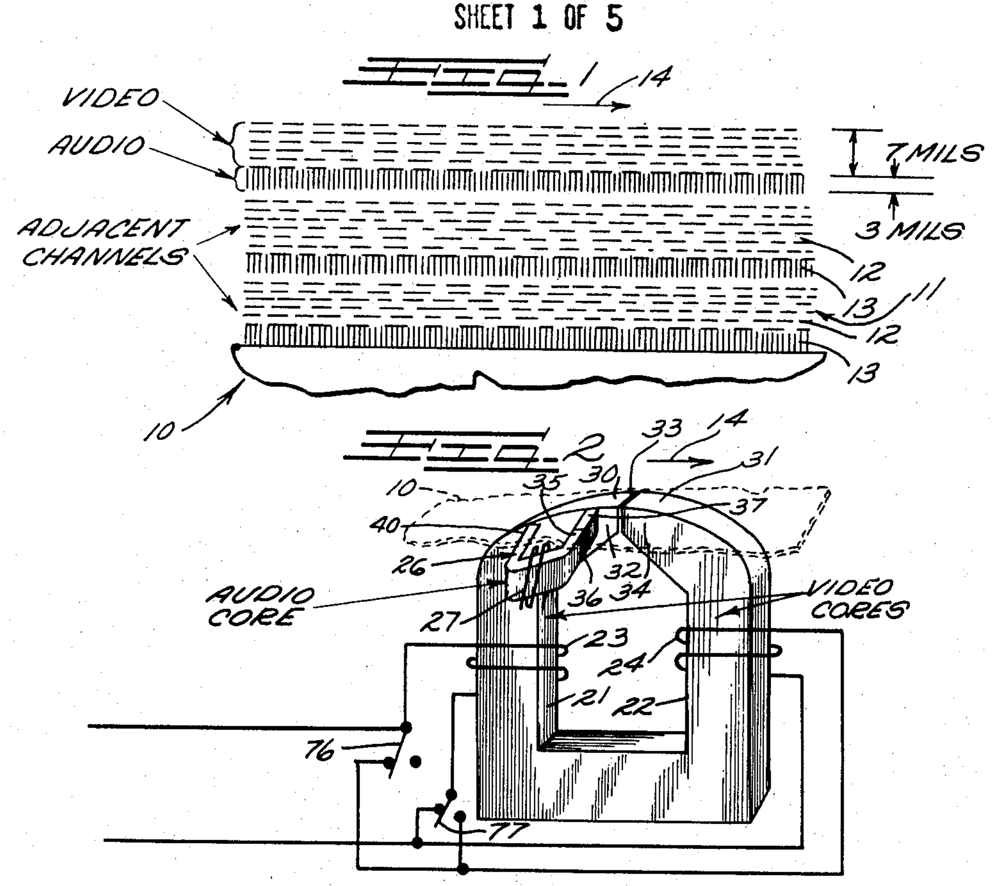
FIG. 1 is a somewhat diagrammatic fragmentary plan view of a magnetic record tape and illustrating diagrammatically the recorded fields of a composite audio-video track and illustrating the relationship of adjacent channels formed of such composite tracks.
FIG. 2 is a somewhat diagrammatic perspective view of a composite audio-video transducer head for recording the composite audio-video tracks of FIG. 1.
Figure 3:
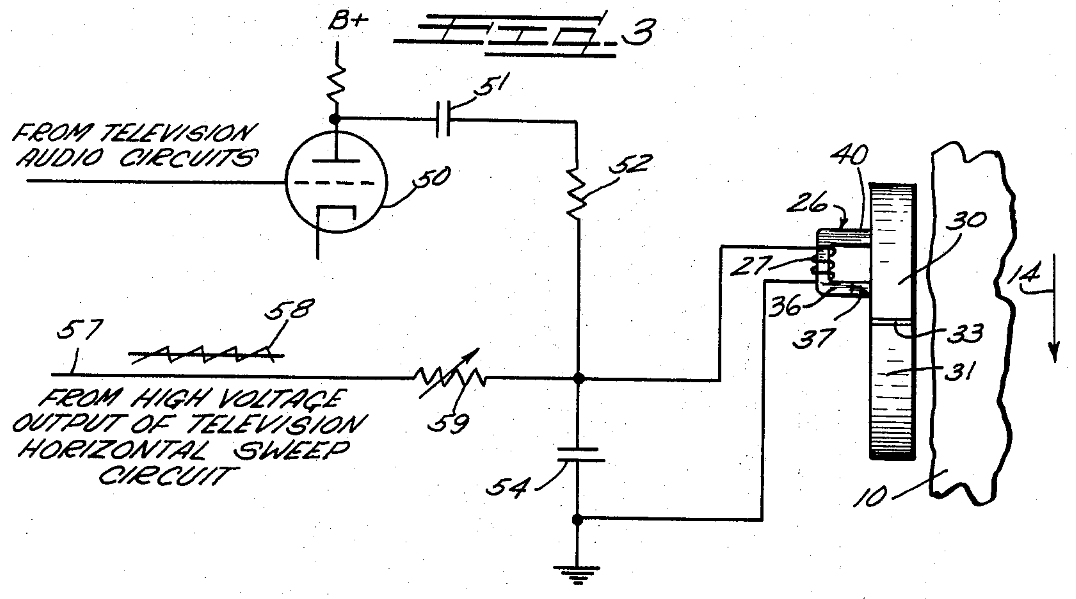
FIG. 3 is a circuit diagram illustrating a preferred audio recording circuit for the head of FIG. 2.
Figures 10, 13:
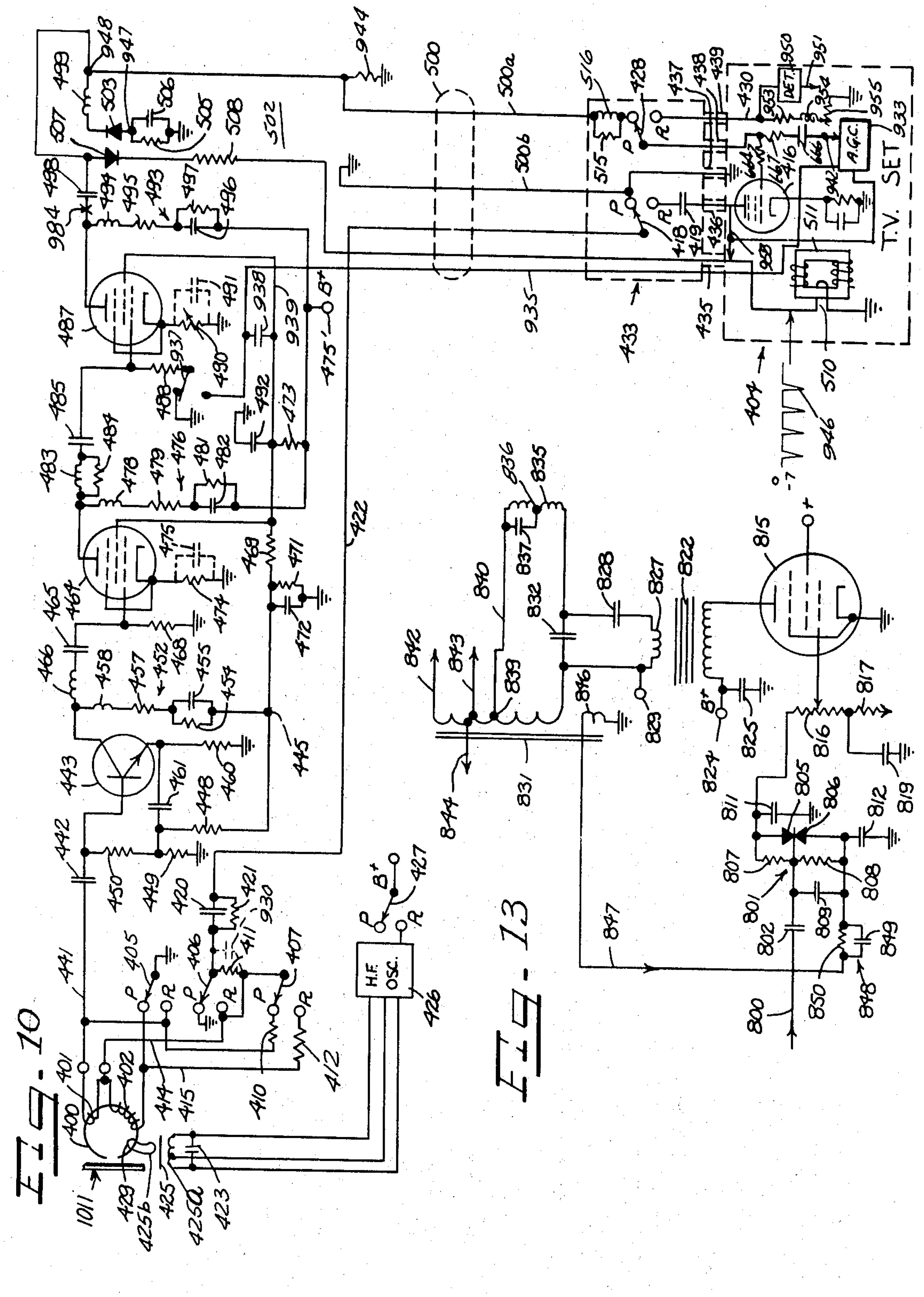
Figure 12:
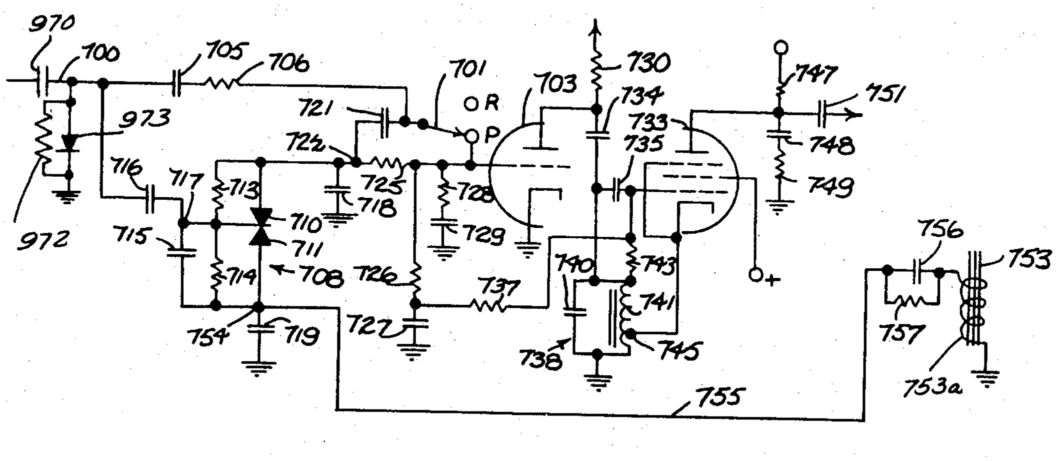
Figure 11:
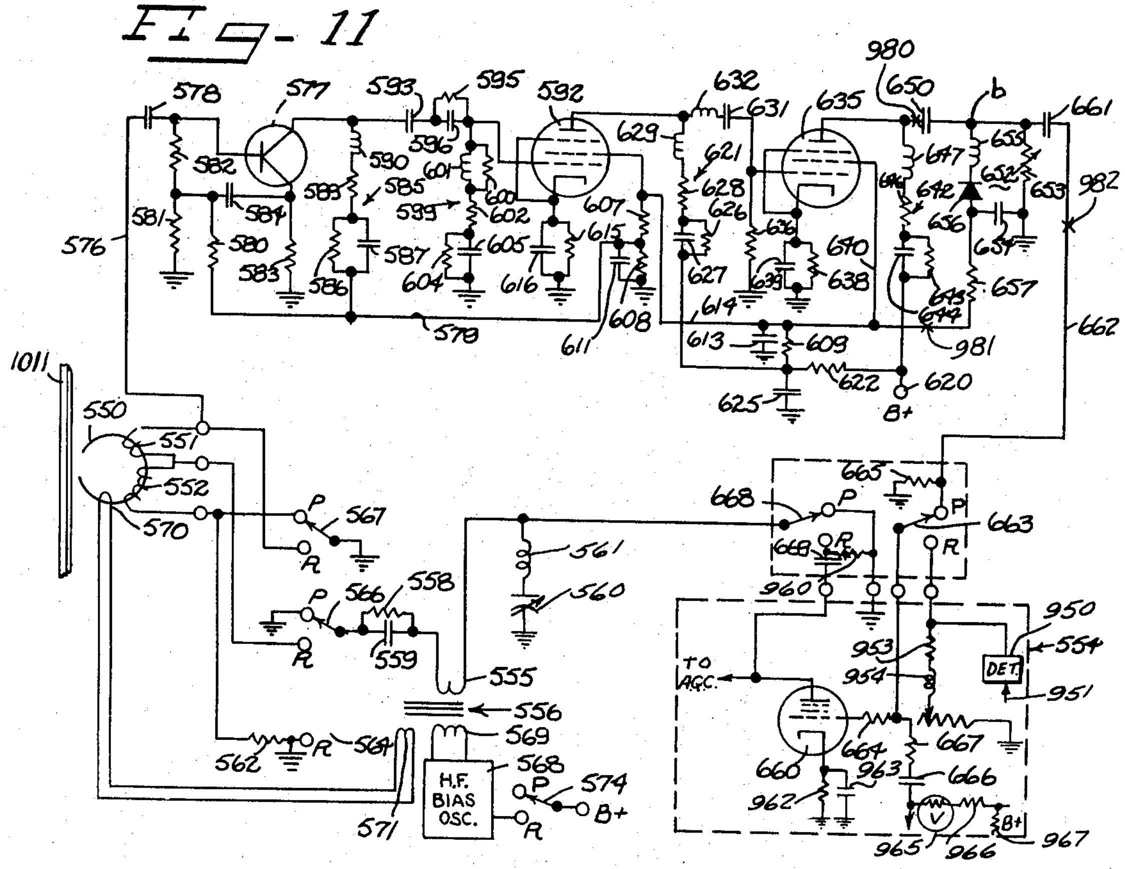

FIG. 7 is a plot of recording head current as a function of frequency for constant input voltage and corresponds to the tenth figure of Ser. No. 528,934 filed Feb. 21, 1966 (now abandoned), and of Ser. No. 62,601 filed 8/10/70, now U.S. Pat. No. 3,683,107;

FIG. 8 shows graphically response curves as a function of frequency particularly with reference to the system of the first figure of Ser. No. 649,256 filed 6/27/67, now U.S. Pat. No. 3,596,008, and corresponds to the seventh figure of Ser. No. 649,256;

FIG. 8A illustrates further response curves utilized in explaining the operation of the video amplifier of the first figure of Ser. No. 649,256, the curves corresponding to those shown in the eighth figure of Ser. No. 649,256;

FIG. 8B shows the relative output voltage of the playback winding means when any of the embodiments hereof is operated to have a mid band resonance frequency, and to have an amplifier input impedance comparable to the head impedance at the mid band resonance frequency;

FIGS. 9 and 9A are graphical representations showing the phase shift obtained from respective video coils of the transducer head shown in FIGS. 1–3 of U.S. Pat. No. 3,495,046, as the frequency applied thereto increases, and showing the output as a function of frequency, respectively;

FIG. 10 is a schematic wiring diagram showing circuit connections and component arrangement used during a playback operation with the recording system of FIG. 8 of U.S. Pat. No. 3,495,046;

FIG. 11 is a schematic wiring diagram showing an alternate embodiment for use in place of the circuit of FIG. 10;

FIG. 12 is a schematic wiring diagram of a preferred horizontal sweep control circuit for a television receiver to be used for recording and playback of video signals in conjunction with the system of the present invention; and FIG. 13 is a schematic wiring diagram of an alternative horizontal sweep output circuit for use in place of the circuit of FIG. 12.

DETAILED DESCRIPTION OF THE EMBODIMENTS OF THE ACCOMPANYING DRAWINGS

Description of FIGS. 1–6

This description corresponds to that found at pages 4–21 of my application Ser. No. 344,075 and FIGS. 1–6 hereof correspond to FIGS. 1–6 of Ser. No. 344,075.

FIG. 1 illustrates a magnetic record medium 10 having a series of channels such as indicated at 11 each channel comprising a composite audio-video track including a video portion 12 which is longitudinally recorded and an audio portion 13 which is directly adjacent thereto and is transversely recorded. Thus the fields of the video portion 11 are directed longitudinally of the direction of movement of the record tape 10 which is indicated by the arrow 14 while the recorded fields of the audio portion 13 are preferably at right angles to the direction of travel of the record medium 10. By way of example, the record tape 10 may have a width of ¼ inch and may provide a total of 20 channels. The composite audio-video track may occupy ten mils of each channel, and the video portion 12 may have a width of seven mils while the audio portion 13 has a width of three mils (one mil equals 0.001 inch.

FIG. 2 illustrates a composite audio-video magnetic transducer head for energization to produce the composite audio-video tracks such as illustrated in FIG. 1. The composite head comprises a pair of video core parts 21 and 22 having video frequency signal windings 23 and 24 thereon. The head further comprises an audio core part 26 having an audio frequency winding 27 thereon. In operation, the magnetic record tape 10 travels with its active surface in contact with the polar surfaces 30 and 31 of the core parts 21 and 22 and may travel first over the pole 32 providing surface 30, then across the gap 33 of non-magnetic material and then across the pole 34 providing the polar surface 31. A polar surface 35 of the pole 36 of the audio core 26 may also engage the active undersurface of the record medium and may define a gap of non-magnetic material 37 with an opposing face of the pole 32 of core part 21. The polar surface portion 35 of pole 36 may lie generally flush with the polar surface 30 while adjacent portions of the core 26 may be offset below the surface of the record tape as it travels across the transducer head assembly. The audio winding 27 is, of course, substantially spaced below the active surface of the tape, with respect to the orientation shown in FIG. 2, so as to avoid any undesirable interaction between leakage fields associated with the winding 27 and adjacent channels of the magnetic record tape 10. By way of example, the non-polar end 40 of the audio core 26 may abut against the video core part 21 to complete an audio magnetic circuit. The ends of core parts 21 and 22 remote from the gap 33 may abut each other as indicated to provide a low reluctance magnetic flux path linking the windings 23 and 24.

In order to produce a video track portion 12 having a width of about seven mils, the width of the core parts 21 and 22 and the transverse dimension of the gap 31 defined by the core parts should be approximately seven mils. The transverse gap defined between pole 36 of audio core 25 and the adjacent portion of video core part 21 should have a dimension at right angles to the direction of travel of the record medium of about three mils to provide an audio track portion three mils wide as described in connection with FIG. 1. The thickness dimension of the pole 36 which dimension is in the direction of tape travel is preferably selected to provide a null in response to recorded wavelengths corresponding to the horizontal sweep frequency of the video signal being recorded. Thus if $\lambda$ is the recorded wavelength on the record tape corresponding to the line frequency and n is an integer, the effective thickness of the pole 36 in the direction of travel of the record medium should be $n\lambda$. This gives a null in the response of the head of FIG. 2 in the audio circuit which tends to prevent interference between the audio and video signals on the tape. If the thickness of the pole 36 is represented by the letter W, the tape velocity by the letter V, and it is assumed that thet line frequency is 15,750 cycles per second, then W equals $nV/15{,}750$.

The record tape 10 is driven in the direction of the arrow 14 across the transducer head of FIG. 2 by any suitable tape transport mechanism. By way of example, if a ¼ inch wide tape of audio grade material is moved at a speed of 110 inches per second, with 20 tracks and a seven inch reel, the playing time will be between 140 and 120 minutes depending on the tape thickness. Picture quality will be improved further by proper use of microgap and cross field heads. Higher tape speeds are also feasible since the playing time is still adequate even when reduced by a factor of two or three.

As illustrated in FIG. 3, the audio winding 27 of the audio core 26 is preferably supplied with an audio frequency signal by means of an audio output amplifier stage 50 whose input is coupled to the audio circuit of a television receiver. The audio signal is coupled to the winding 27 by a capacitor 51 and resistor 52 to develop the audio frequency signal across a tuning capacitor 54.

Preferably, the high frequency bias for the audio signal is generated by coupling the capacitor 54 to the high voltage sawtooth output of the television set horizontal sweep generator circuit via line 57. The waveform from the television circuits is indicated at 58 in FIG. 3. A variable resistor 59 is interposed in the line 57 to provide for adjustment of bias amplitude to the optimum level in accordance with known principles. The capacitor 54 in conjunction with the inductance of the head winding 27 provides a tuned circuit which is preferably resonant at a harmonic of the sweep frequency, for example at the third harominc or 47.25 kilocycles per second. As an alternative, the circuit comprising capacitor 54 and winding 27 may be tuned to the fundamental frequency which under present standards is 15,750 cycles per second. As a further alternative, a series of pulses may be supplied to the winding 27 of constant amplitude and of a relatively high frequency substantially above the audio range to provide the bias signal superimposed on the audio signal from the amplifier stage 50.

Preferably the audio frequencies supplied from the stage 50 to the head winding 27 are equal to or lower than the video line frequency. The transverse recording of the audio signal allows efficient recording even at high tape speed such as 110 inches per second and provides insolation between the video track portions of adjacent channels.

Referring to FIG. 3, capacitor 51 may have a value of .1 microfarad and resistor 52 may have a value of 50,000 ohms. Resistor 59 is adjusted to give a bias current in the head about 10 times as great as the audio frequency head current.

Figures 4, 5, 6:
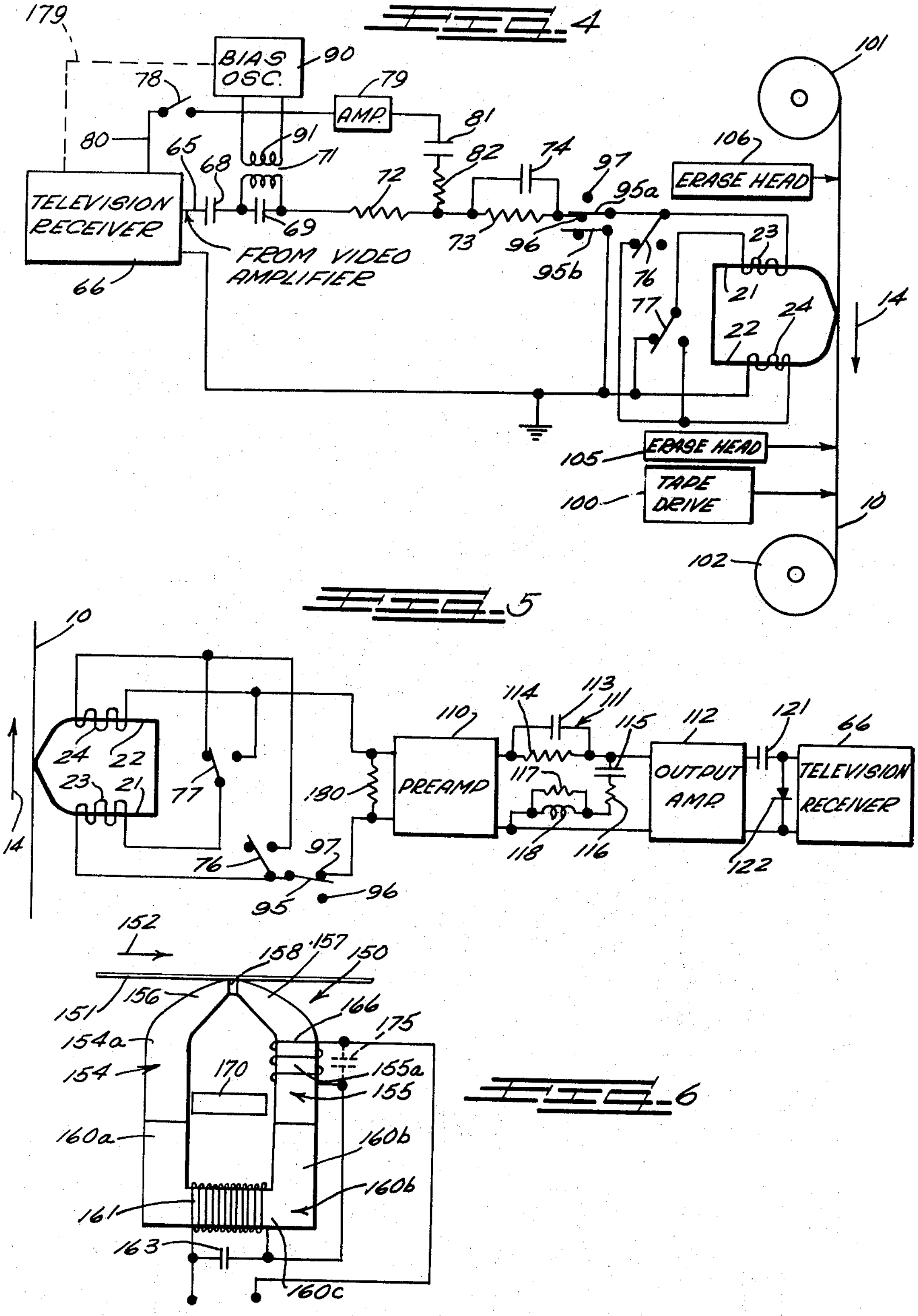
FIG. 4 is a circuit diagram illustrating a preferred video recording circuit for the head of FIG. 2.
FIG. 5 is an electric circuit diagram illustrating a preferred video playback circuit for the head of FIG. 2.
FIG. 6 is a diagrammatic illustration of a modified transducer head capable of recording relatively low frequency and relatively high frequency signals on a single track of a record medium and for electrically reproducing the recorded signals.

FIG. 4 illustrates a preferred video recording circuit for the head of FIG. 2. In this circuit, line 65 is coupled to the output of a video amplifier of a conventional television receiver 66. The video frequency signal is coupled to the windings 23 and 24 in parallel via a capacitor 68, the parallel combination of a capacitor 69 and secondary winding 70 of a transformer 71, resistor 72 and the parallel combination of resistor 73 and capacitor 74. During the recording mode switch means 76 and 77 are in the positions illustrated so as to connect the windings 23 and 24 in parallel during recording.

The horizontal and vertical synchronizing signals may be supplied to line 65 along with the video frequency signal components as a conventional composite signal, or switch 78 may be closed to supply an increased amplitude of the vertical and horizontal sync signals from receiver 66 to line 80. With switch 78 closed, the sync signals would be supplied via amplifier 79, capacitor 81 and resistor 82 to a point intermediate resistor 72 and resistor-capacitor combination 73, 74. In either case the horizontal and vertical sync signals are recorded on the video track portion 12 between the successive lines of the video signal itself.

A bias oscillator 90 is connected to the primary 91 of transformer 71 so as to superimpose a bias frequency signal on the video signal supplied to the head windings 23 and 24. The bias oscillator 90 preferably operates in the megacycle range and preferably operates at a frequency of approximately three megacycles per second. From 2 megacycles to 8 megacycles per second may be used and even higher frequencies are possible.

The head windings 23 and 24 are connected in parallel during recording to reduce inductance for operation at the megacycle bias frequencies, but are connected in series during playback for higher output. The switch means 76 and 77 are thus placed in their right-hand positions as viewed in FIG. 4 during playback. Switch 95 has been inserted in the circuit and comprises a movable contact **95*a* engaging stationary contact 96 during recording and engaging stationary contact 97 during playback. Contact 95*b* connects contact 96** to ground during playback to prevent interference in the playback circuits.

The tape drive for the tape 10 is indicated diagrammatically at 100 and may comprise any suitable drive for translating the tape 10 first in the direction of the arrow 14 while one channel of the tape is being scanned and then for translating the tape in the opposite direction as an adjacent channel on the tape is scanned in the opposite direction and so forth. The head comprising parts 21, 22 and 26 is preferably shifted laterally between successive channels at successive reversals of the direction of drive of the tape 10 so that only a single head assembly is required. The tape drive 100 preferably includes an automatic reversal system having switches actuated by means at the opposite ends of the tape 10 to initiate a reversal cycle. The actual reversal preferably automatically takes place during a vertical blanking interval so that it is not visible in the reproduced picture. The changeover is preferably controlled by the vertical synchronizing signal recorded on the tape 10. The reproduced vetical synch signal which causes tape reversal would be the one following actuation of the end of tape sensing switch. The end of tape sensing switch may be actuated by electrical contact material adhered to the tape near the opposite ends thereof. An electronic gate circuit could be opened by a flip-flop circuit when the flip-flop circuit is placed in a "set" condition in response to actuation of the end of tape switch; the gate would then transmit the next reproduced vertical synch pulse to effect tape drive reversal. Instead of electrical contact material on the tape to signal the approach of an end of the tape, a special changeover signal may be recorded on the tape which when reproduced will be transmitted to the electronic flip-flop circuit to set the flip-flop.

Resistor 72 in conjunction with the resistor-capacitor combination 73, 74 may serve as an equalizer for the various components of the video signal and by way by example, resistor 72 may have a value of 6,000 ohms, resistor 73 a value of 10,000 and capacitor 74 a value of 200 picofarads. Capacitor 81 may have a value of 10 picofarads and resistor 82 a value of 2,000 ohms, for example.

Instead of utilizing supply and take-up reels such as indicated at 101 and 102 in FIG. 4 for the tape 10, the tape 10 may be in the form of an endless loop with the head assembly gradually shifted between successive channels in the manner illustrated in my U.S. Pat. No. 2,857,164 issued Oct. 21, 1958. In this type of embodiment, the tape continues to run throughout the recording operation and the shifting of the head takes place gradually at a given point along the tape loop as illustrated in the ninth figure of said U.S. Pat. No. 2,857,164. Of course, if an abrupt transition between successive channels is to be accomplished, then automatic means would be provided for shifting the head during the vertical blanking interval occurring near the desired point on the tape loop with the shifting being triggered by a signal recorded on the tape for this purpose as previously mentioned. Alternatively, the shifting between channels may take place during a transition period with no break in the recorded program.

Suitable channel width erase heads are indicated at 105 and 106 which are successively energized in accordance with the direction of tape movement so as to insure an erased channel prior to recording regardless of the tape direction. Such channel type erase heads would have a width of the order of twelve mils for the example given. An additional demagnetizing head of width to erase the entire tape could be provided for reducing the noise level between tracks. In the example given such an erase head would have a width of the order of 250 mils.

FIG. 5 illustrates a playback circuit utilizing the same head assembly as in FIGS. 2, 3 and 4. During playback, the windings 23 and 24 are connected in series by means of switch 77 and the windings are coupled via a preamplifier 110 and an equalizer network 111 to an output amplifier 112. The network 111 may comprise a shunt combination of a capacitor 113 and a resistor 114, and a shunt circuit comprising a capacitor 115, a resistor 116 and a parallel combination of a resistor 117 and inductance 118. By way of example resistor 114 may have a value of 10,000 ohms, capacitor 115 a value of 0.002 microfarads, resistor 116 a value of 800 ohms and inductor 118 a value between 0.02 millihenries and 1 millihenry. Resistor 117 may have a resistance value comparable to that of resistance 116.

The output amplifier 112 is coupled to the video input of the TV receiver 66 via a capacitor 121 and a shunt arranged diode 122. By way of example the capacitor 121 may have a value of from microfarad 0.01 microfarad to 1.0 and the diode 122 may be a type 1N35.

SUMMARY OF THE OPERATION

During recording mode as illustrated in FIG. 4, the switch arm 95a makes contact with the stationary contact 96 to supply the video signal from receiver 65 via line 65 to windings 23 and 24 of the video core parts 21 and 22 in parallel. High frequency bias having a frequency of the order of three megacycles per second is superimposed by means of transformer 71 on the video signal. Horizontal and vertical synchronizing signals are preferably supplied to the windings 23 and 24 via line 65 along with the video frequency component.

During drive of the tape 10 in the direction of the arrow 14 in FIG. 4, erase head 105 may be energized, while upon reversal of the direction of tape drive 100, erase head 105 may be energized. The erase heads preferably produce high frequency erase fields having frequencies of at least about five megacycles per second and of amplitude to effectively reduce the level of magnetization of the tape to zero prior to the video recording step. Upon reversal of the direction of tape drive, the head assembly illustrated in FIGS. 2 and 4 may be shifted laterally to scan a further channel on the record medium so as to produce a succession of composite audo-video tracks running in opposite directions as illustrated diagrammatically in FIG. 1. The audio track portion 13, FIG. 1, is recorded at right angles to the direction of movement of the tape for efficient audio recording even at high tape speeds of the order of 110 inches per second, and the transversely recorded audio track portions give isolation between the video track portions such as indicated at 12 in FIG. 1.

The tape 10 may be ¼ inch wide and of audio grade material and when operated at 100 inches per second may provide a playing time of 40 – 120 minutes for the width of channels specifically disclosed herein. The high frequency bias is introduced and its frequency selected so as to avoid beat notes with the video recording current, and with the television receiver radio frequency and intermediate frequency circuits.

The windings 23 and 24 are connected in parallel during recording to reduce inductance for operation at the megacycle bias frequencies, but are connected in series for higher output during playback by means of the switch means indicated at 76 and 77.

The thickness dimension of the audio recording pole indicated at 36 in FIG. 2 is selected to give a null in respone at the line frequency so as to tend to prevent interference between the audio and video signals on the tape during playback. The audio circuit bias may be derived from the television receiver sweep circuits so as to avoid interference and eliminate the need for an oscillator. In the specific circuit illustrated, a capacitor 54 tunes the head winding to a resonance, preferably at a harmonic of the sweep frequency to give an improved waveform at, for example, 47.25 kilocycles per second for a line frequency of 15,750 cycles per second.

FIG. 6 illustrates a head 150 for recording both relatively low frequency signals and relatively high frequency signals on a magnetic tape 151 moving in the direction of arrow 152. The head may comprise a pair of core parts 154 and 155 of relatively low eddy current loss magnetic material such as ferrite providing a pair of pole portions 156 and 157 having a gap 158 therebetween a non-magnetic material. The lower yoke 160 preferably has moderate or relatively low losses in the low frequency range but relatively high losses at the high frequency range.

The winding 161 on the yoke 160 has a large number of turns for providing a relatively large playback voltage at low frequencies. The winding 161 resonates, either by virtue of leakage capacitor or by virtue of a tuning capacitor 163, at a frequency below the maximum required band width for the system.

At the higher frequencies of the band width, winding 166 with fewer turns is effective and supplies the major part of the output of voltage through the capacitance 163.

Winding 161 is placed such that there is a relatively appreciable leakage in its coupling to the gap 158. Coil 166 is placed such that there is relatively a minimum of leakage in its coupling with the gap and a leakage which is substantially less than that with respect to the winding 161. This may be done by placing winding 161 farther from the gap 158 along the magnetic circuit than winding 156; for example, winding 161 can be on the bottom leg of yoke 160 as illustrated and/or winding 161 can be partially magnetically shunted as by means of a shunt piece 170. The piece 170 may, of course, be of relatively high permeability "magnetically soft" material.

If winding 161 has ten times the number of turns of winding 166 and a resonant frequency of 30 kilocycles per second, then at a drop of 12 decibels per octave or 40 decibels per decade beyond resonance, the output of winding 161 would be 40 decibels down at 300,000 cycles per second. The smaller winding 166, if resonant itself or with circuit capacitance as indicated at 175, may have a resonance frequency above 300,000 cycles per second. Because of the fewer number of turns its direct voltage is 1/10 that which might be possible with winding 161, so that its output is 20 decibels down instead of 40 decibels. The net gain with this winding arrangement is 20 decibels at high frequencies under these conditions. At 1.2 megacycles per second the output from winding 161 is 40 plus 24 equals 64 decibels down. If winding 166 has 1/40 the turns of winding 161 to give a minimum resonance frequency of 1.2 megacycles per second for winding 166, the output of winding 166 is 32 decibels down because of the fewer number of turns thereof, giving a net improvement of 32 decibels. At the same time the winding 161 gives a large low frequency output, reducing amplifier requirements and noise level, and requiring less low frequency equalization. The head is especially useful for video recording where many octaves of band width are necessary. The winding 166 may be distributed to each of the leg portions 154*a* and 155*a* and the winding 161 may be distributed to the leg portions 160*a* and 160*b* of yoke 160 instead of being on the base leg 160*c*.

The capacitor 175 in FIG. 5 has been shown dotted to represent the stray capacity shunting winding 166. The capacitor 163 may also consist entirely of the stray capacitance of the winding 161, or the stray capacitance of the winding 161 may be supplemented by an external capacitor as indicated at 163 in FIG. 6. The head of FIG. 6 for simplicity may be of one material such as "Permalloy" and still advantageously utilize the windings 161 and 166 having the respective positions and numbers of turns as previously described.

As an alternative, the arrangement of FIG. 4 may be utilized to record both the video portion of the signal and the audio portion. By way of example, the line 80 from the horizontal sync of the television receiver may be connected to a pulse width modulator controlled by the audio signal. Alternatively, the audio signal may be inserted just after and/or just prior to the horizontal blanking interval so that the audio is in effect being recorded by using a narrow part of the edge of the picture being transmitted. In this event, the audio and video portions of the signal would be recorded in successively opposite directions along successive adjacent channels utilizing the tape driving and automatic reversal methods previously described.

While suitable circuit values and other parameters have been mentioned previously herein, the following are the preferred parameters at the present time. In FIG. 1, a ¼ inch tape may preferably have 10 to 12 channels each having a video track portion 14 mils in width and an audio track portion 3 mils in width. From three to eight mils spacing is thus provided between tracks where the tape is nominally 246 mils wide. The core parts 21 and 22 would, of course, have a width of 14 mils approximately for recording this width of video track portion, and the gap material 37 would have a transverse dimension of approximately 3 mils to provide an audio track portion of 3 mils in width. The dimension of the pole portion 36 in the direction of tape travel is as previously described.

Referring to FIG. 4, the presently preferred circuit includes a capacitor 68 of 1.0 microfarad, a resistor 73 of 50,000 ohms and a capacitor 74 of 8 picrofarads (one picofarad equals one micromicrofarad). In the preferred circuit, the resistor 72 is omitted or short circuited. As previously described, the horizontal and vertical sync signals may be supplied to the head windings 23 and 24 via conductor 80 with the amplifier 79 inverting the polarity of the pulses if necessary, and providing greater output if necessary. However, the preferred arrangement is with the switch 78 open and the conductor 65 connected to a point in the video circuits where the composite video signal is present including the horizontal and vertical synchronizing components.

A preferred high frequency bias source 90 in FIG. 4 provides an output frequency synchronized with the audio frequency carrier of the television receiver. Under present standards in the United States the bias oscillator 90 is preferably operated at 4.5 megacycles per second and is preferably locked to the audio carrier frequency of the television receiver 66. Such a coupling between the audio stage of the receiver 66 and the bias oscillator 90 is indicated diagrammatically by the dash line 179 in FIG. 4. The high frequency bias oscillator 90 may also operate at a multiple or submultiple of 4.5 megacycles per second, for example, 2.25 megacycles per second or 8 megacycles per second, locked to the audio carrier frequency of the television receiver 66 so as to avoid interference, or tuned to a frequency that avoids interference.

With respect to FIG. 5, it is found to be preferable to include a resistor 180 having a value of about 50,000 ohms across the head windings 23 and 24 to reduce the resonant peak in the response characteristic of the head. The preferred circuit parameters of the arrangement of FIG. 4 includes a resistor 180 of 50,000 ohms, a capacitor 113 of 200 picofarads, a resistor 114 of 1,200 ohms, a capacitor 115 of .05 microfarads, a resistor 116 of 33 ohms, a resistor 117 of 1,000 ohms and an inductance 118 of 50 microhenries. Resistor 117 may be omitted. The arrangement of the series RC shunt combination including capacitor 113 and resistor 114, in conjunction with the RLC shunt circuit including capacitor 115, resistor 116 and inductor 118 constitutes a highly advantageous equalizer circuit for the playback system. The addition of the diode circuit including capacitor 121 and diode 122 further improves the response of the system in conjunction with the equalizer network 111.

With respect to the playback circuit of FIG. 5, it is possible to introduce some of the output from the longitudinal video track circuit into the audio circuit of FIG. 3 (and/or vice versa) to cancel any stray magnetic pickup from the video track by the audio head (and/or from the audio track by the video head). The coupling from the video circuit into the audio circuit may be through low pass filters and phase shifters if necessary to secure best balance.

The video cores 21, 22 may be formed of 0.5 mil "Permalloy" laminations having a width dimension in the plane of FIG. 2 of about ½ inch, for example. The laminations would be stacked to provide the desired depth of 7 mils or preferably 14 mils. The video windings 23, 24 may each have 100 to 600 turns while the audio coil 27 may have 2,000 turns, for example.

Referring to an arrangement such as illustrated in FIG. 4, a direct current bias may be supplied to the windings 23 and 24 so as to cause the video frequency components of the applied signal to be recorded on a relatively linear positively sloping portion of the $B_R$ versus H curve of the magnetic material of tape 10. The horizontal and vertical synchronizing pulses could be supplied via amplifier 79 so as to have a relatively large amplitude and a polarity opposite to the direct current bias supplied to the windings 23 and 24 so that the synchronizing pulses would be recorded on a linear negatively sloping portion of the $B_R$ versus H curve of the magnetizable material of the tape (with an opposite polarity of magnetization as compared to the bias video frequency components).

It will be understood that the use of magnetic keepers generally as shown in my U.S. Pat. Nos. 2,543,771 and 2,561,338 may be desirable with the heads shown in FIGS. 2 and 6. Further, the use of cross field type heads as disclosed in my U.S. Patents 2,628,285, 2,803,708 and 3,013,123 and in my pending application Ser. No. 125,121 filed July 24, 1961 is very desirable in order to give the highest possible resolution. The tape drive 100 may comprise capstans on each side of the head assembly with cooperating pinch rollers having a very fast operating speed for quick reversal of the tape.

Excellent operation has been obtained in the circuit of FIG. 5 with a minimum bias field amplitude and with a relatively strong video signal amplitude.

"Permalloy" may have a composition of 4% molybdenum and 78% nickel and the remainder iron and minor constituents.

It will be apparent that many modifications and variations may be effected without departing from the scope of the novel concepts of the present invention.

Description of FIGS. 7 and 8

The description of FIG. 7 corresponds to that of the tenth figure of Ser. No. 62,601. See especially application page 27 of Ser. No. 62,601, and application page 64 of Ser. No. 649,256, lines 13–15.

FIG. 8 corresponds to the seventh figure of Ser. No. 649,256. See especially application page 34 of Ser. No. 649,256.

Curves A and B of FIG. 8A correspond to curves eight hundred and one, and eight hundred and two, respectively of the eighth figure of Ser. No. 649,256; see especially application pages 37 and 38 Ser. No. 649, 256.

Curve C of FIG. 8B would be obtained by moving a record tape with a constant flux signal recorded thereon across the playback head of the system of the first figure of U.S. Pat. No. 3,596,008. Essentially curve C can be inferred from the overall response curve 702 of FIG. 8 and from the circuit parameters given in U.S. Pat. No. 3,596,008. Also it should be noted, as is illustrated by curve C, that the first stage 1–Q1 of the first figure of U.S. Pat. No. 3,596,008 operates at a low collector current and voltage to give a high input impedance and low noise level. (See application page 35, line 4 through page 36, line 6 of Ser. No. 649,256.)

Curve C illustrates that resistor (120) and the input impedance of the amplifier provide only a limited degree of damping since the playback voltage from the head rises at six db. per octave in the low frequency band. If the head output were heavily loaded by a low resistance across the winding, the six db. per octave rise would not occur in this region but would be altered to a level response. The input resistance of the first amplifier stage is comparable to the impedance of the high turns winding at medium and high frequencies (within a factor of about two).

Description Of FIGS. 9, 9A and 10–13

The following description corresponds to that found at pages 30–94 of my application Ser. No. 848,992 which is a division of Ser. No. 401,832 filed Oct. 6, 1964, now U.S. Pat. No. 3,495,046. The first through eighth figures of Ser. No. 848,992 are identical to the figures of U.S. Pat. No. 3,495,046, while FIGS. 9, 9A and 10–13 hereof are identical to the corresponding Figures. of Ser. No. 848,992.

The tape recording system of the present invention has a video recording and playback circuit which is shown in the FIG. 10. The circuit of FIG. 10 is primarily concerned with the video intelligence and synchronizing signals and therefore the audio portion of the transducer head is not shown. The audio portion of the system and the details of the video head may be considered as substantially the same as for the corresponding parts of the system shown in FIGS. 1–7 of U.S. Pat. No. 3,495,046.

As shown in FIG. 10, the magnetic record medium 1011 is moved across the transducer head, which is represented by the video magnetic core 400 and which has mounted thereon a pair of video coils 401 and 402. The record and playback circuit of FIG. 10 is utilized with a commercially available television receiver indicated at 404.

Referring to FIG. 10 record - playback selector switches 405, 406 and 407 are shown in the playback position so as to connect the coils 401 and 402 in the series. With the switches 405–407 in the playback position, the coil 401 is shunted by a resistor 410, while the coil 402 is shunted by a resistor 411. Resistors 410 and 411 are connected across the coils 401 and 402 respectively to suppress undesirable "ringing" or resonance oscillations which may occur in the coils during the playback operation. When the switches 405–407 are placed in the record position, the coil 402 has a resistor 412 connected thereacross by switch 407 through line 414 and 415, and only the coil 401 is energized through the line 414 from the television receiver of 404. Alternatively, coil 402 may be short circuited during recording.

A video amplifier tube 416 of the television receiver 404 has the output signals thereof connected to the record terminal of a selector switch 418 through a capacitor 419. The signal from the tube 416 is applied to a parallel network comprising capacitor 420 and resistor 421 through a line 422 during the operation of the system.

A high frequency bias signal is applied to the primary winding 425*a* of a transformer 425 from a high frequency oscillator 426. A capacitor 423 is connected across the primary winding 425*a*. The oscillator 426 is energized when a selector switch 427 is placed in the record position, to supply the necessary direct current operating voltage to the high frequency oscillator 426. The secondary 425*b* of transformer 425 is connected to a cross field conductor 429 of heat 400. Also during the record operation of the tape recording system, a switch contact 428 is connected. to a line 430 in the television receiver 404 to supply the usual composite video signal to the tube 416 from the broadcast receiving circuits of receiver 404.

To facilitate construction of the tape recording 5 system of the present invention, an adaptor box 433 is provided for connection to the television receiver 404 preferably as a plug-in unit although the components within box 433 may alternatively be individually wired into the circuit of set 404. Plug-in connections are diagrammatically indicated at 435–439.

During the playback operation of the system, all the selector switches 405–407, 418, 427 and 428 are placed in the playback position indicated by the letter P in FIG. 10. This action will remove the high frequency bias from the transformer 425 and will also prevent the television receiver 404 from receiving any intelligence signal other than that from the record medium 11.

As the record medium 11 moves over the transducer head 400 during a playback, the video and synchronizing intelligence from the coils 401 and 402 is applied through a line 441 and a capacitor 442 to a base electrode of the transistor 443, which is the first stage of amplification of the wide band amplifier shown in FIG. 10. A low direct current supply voltage is developed at circuit points 445 by means of a voltage divider 469, 471 in conjunction with a filter capacitor 472. This voltage is applied to the base electrode of the transistor 443 from a voltage divider network comprising resistors 448 and 449 via a resistor 450. The low supply voltage at circuit point 445 is also applied to the collector electrode of the transistor 443 through a compensating circuit 452 which comprises a parallel network consisting of a resistor 454 and a capacitor 455 connected in series with a resistor 457 and an inductor 458.

A biasing resistor 460 and a feedback capacitor 461 are connected to the emitter electrode of the transistor 443 to provide the necessary operating bias. The output of transistor 443 is then applied to the grid electrode of a pentode tube 464 through a capacitor 465 and an inductor 466.

A grid return resistor 468 is connected between the grid electrode of the tube 464 and ground. The screen grid of the pentode 464 is supplied with positive voltage by virtue of the connection of a resistor 473 between the screen grid circuit and power supply terminal 475'. The pentode 464 is biased by a cathode resistor 474. A capacitor 475 shunting resistor 474 is shown in dotted outline since it may be omitted from the circuit with some reduction in gain, or a small value of capacitance (about 0.001 microfarads) may be used for high frequency emphasis while accepting reduced gain at lower frequencies. A direct current supply voltage for the tube and transistor circuits is obtained from a terminal 475'. The terminal 475' is connected to the plate electrode of tube 464 through a compensating circuit 476 consisting of an inductor 478, a series resistor 479 and a parallel network including a resistor 481 and a capacitor 482.

The output of the second stage of amplification is then applied through a parallel network consisting of an inductor 483 and a resistor 484 and therefrom through a capacitor 485 to the control grid electrode of a pentode 487. The parallel network consisting of inducctor 483 and resistor 484 comprise a compensating or correcting circuit. Connected between the control electrode of pentode 487 and ground is a grid return resistor 488. In the cathode circuit of pentode tube 487 is a variable biasing resistor 490 which serves as a gain control for the output of the amplifier circuit shown in FIG. 10. Shunting the variable resistor 490 is a capacitor 491, which may be omitted entirely with some reduction of gain, or a small capacitance may be used for high frequency emphasis. The screen grid electrode of pentode 487 is also connected to the resistor 469. A capacitor 492 is connected between the screen grid electrodes of pentodes 464 and 487 and ground for bypassing the screen grid electrodes. The supply voltage is applied to the plate electrode of pentode 487 through a compensating circuit 493 comprising an inductor 494, a series resistor 495 and a parallel network consisting of a capacitor 496 and a resistor 497. Both the pentodes 464 and 487 have their suppressor grid electrodes connected directly to their respective cathode electrodes as shown in FIG. 10.

The output from the third and final stage of amplification of the amplifier shown in FIG. 10 is applied to the television receiver 404 through a capacitor 498, an inductor L2 (not shown) and a conductor 500*a* of cable 500. Connected between capacitor 498 and inductor L2 is a clamping network 502 including a series diode 503 connected to a parallel circuit including a resistor 505 and a capacitor 506, and a diode 507 connected in series to a resistor 508 which, in turn, is connected to a winding 510 on the flyback transformer 511 of television receiver 404.

To minimize the effects of stray signals in the amplifier circuit, the chassis of the television receiver 404 is connected to the chassis of the amplifier circuit through a conductor 500*b* of the cable 500. The amplified signal from the last stage of amplification is applied to the control grid of tube 416 of the television set 404 through a parallel network consisting of a resistor 515 and an inductor 516 when switch 428 is in the playback position.

In the preferred embodiment of amplifier circuit described hereinabove, the component values are as follows:

| COMPONENTS | COMPONENT VALUE |
|---|---|
| Capacitor: | |
| 442 | 0.15 microfarad |
| 461 | 50 microfarads |
| 455 | .01 microfarad |
| 465 | .01 microfarad |
| 475 | .001 microfarad |
| 485 | .005 microfarad |
| 492 | 10 microfarads |
| 491 | .001 microfarad |
| 498 | .002 microfarad |
| 496 | .05 microfarad |
| 506 | .05 microfarad |
| 419 | 1 microfarad |
| 420 | 85 micromicrofarads |
| 472 | 50 microfarads |
| Resistors: | |
| 412 | 22,000 ohms |
| 410 | 3,300 ohms |
| 411 | 33 K ohms |
| 421 | 22 K ohms |
| 450 | 10 K ohms |
| 449 | 10 K ohms |
| 448 | 150 K ohms |
| 460 | 1 K ohm |
| 457 | 200 ohms |
| 454 | 18 K ohms |
| 468 | 150 K ohms |
| 474 | 68 ohms |
| 469 | 47 K ohms |
| 471 | 65 K ohms |
| 479 | 5,200 ohms |
| 488 | 150 K ohms |
| Variable Resistor: | |
| 490 | 50 to 250 ohms |
| Resistors: | |
| 495 | 1.5 K ohms |
| 497 | 10 K ohms |
| 508 | 10 K ohms |
| 505 | 470 K ohms |
| 515 | 10 K ohms |
| Inductors: | |
| 458 | 100 microhenries |
| 466 | 250 microhenries |
| 478 | 100 microhenries |
| 483 | 250 microhenries |
| 494 | 100 microhenries |
| L2 | 250 microhenries |
| 516 | 250 microhenries |
| Transistor: | |
| 443 | Type 2 N 708 |
| Tubes: | |
| 464 | Pentode 6 GM6 |
| 487 | Pentode 6 GM6 |
| Diodes: | |
| 503 | 1N34A |
| 507 | 1N34A |

B+(Voltage applied at terminal 475') equals about 250 volts d.c.

An alternate embodiment of recording and playback circuitry is shown in FIG. 11. FIG. 11 is primarily concerned with transducing video intelligence and synchronizing signals and therefore the audio portion of the transducer head is not shown.

As shown in FIG. 11, the magnetic record medium 1011 is moved across a transducer head, which is represented by a video magnetic core 550 having mounted thereon a coil 551 and a coil 552. During recording a commercially available television receiver 554 is used to supply video intelligence and synchronizing signals to the coils 551 and 552. The signal from television receiver 554 is applied to the head via a line 553 a secondary winding 555 of a transformer 556, and a parallel network consisting of resistor 558 and capacitor 559. A variable capacitor 560 and an inductor 561 in series are connected between line 553 and ground. A resistor 562 is connected between the lower terminal of coil 552 and ground. Record playback selector switches 566 and 567 are connected to coils 551 and 552 for selecting different operating conditions during recording and playback.

A high frequency bias oscillator 568 has the output thereof applied to the primary winding 569 of the transformer 556. A portion of the high frequency energy applied to transformer 556 is coupled to a biasing coil 570 on the video magnetic core 550 from a secondary winding 571 on the transformer 556. Operating voltage is applied to the high frequency bias oscillator 568 through a record playback selector switch 574.

In the playback mode of the circuit shown in FIG. 11, video intelligence and synchronizing signals from the coils 551 and 552 are applied through a line 576 and capacitor 578 to the base electrode of a transistor 577, which is the first stage of a wide band video amplifier. A low direct current supply voltage is applied to a line 579 and a portion of the supply voltage is applied to the base electrode of the transistor 577 through a network comprising resistors 580, 581 and 582. The low supply voltage from line 579 is also applied to the collector electrode of transistor 577 through a compensating circuit 585 which comprises a parallel network consisting of a resistor 586 and a capacitor 587 and a series circuit consisting of a resistor 589 and an inductor 590.

The output of transistor 577 is applied to the control grid of a pentode tube 592 by means of a coupling capacitor 593 and a compensating network consisting of a resistor 595 and a capacitor 596 in parallel and a circuit 599 which comprises an inductor 601, a resistor 602, and a resistor 604 and a capacitor 605 in parallel. The screen grid of tube 592 is connected to resistors 607 and 608 and to a resistor 609. A capacitor 611 is connected across the resistor 608 to ground potential for removing any unwanted high frequency components from the line 579, while a capacitor 613 is connected between a line 614 and ground potential for bypassing the screen grid of tube 592. A biasing network comprising a resistor 615 and a capacitor 616 in parallel is connected to the cathode circuit of the 592. The pentode tube 592 has the screen suppressor grid thereof connected directly to the cathode electrode as shown in FIG. 11.

A direct current supply voltage is applied to a terminal point 620 and therefrom to a compensating circuit 621 through a resistor 622. Connected to a point intermediate the compensating circuit 621 and resistor 622 is a capacitor 625 for shunting alternating current signals to ground which might otherwise be impressed on the supply voltage source. Compensating circuit 621 comprises a parallel network consisting of a resistor 626 and a capacitor 627 which is connected to a series network consisting of a resistor 628 and an inductor 629.

The output from the second stage of amplification is then applied through a coupling capacitor 631 and an inductor 632 to the control electrode of a pentode 635. Connected between the coupling capacitor 631 and ground potential is a resistor 636. Connected to the cathode circuit of tube 635 is a biasing network consisting of a resistor 638 and a bypass capacitor 639. The substantially reduced direct current potential on line 614 is applied to the screen grid to tube 635 through a line 640, while the suppressor grid of tube 635 is connected directly to the cathode electrode as shown in FIG. 11.

The output from the third and final stage of amplification of the video amplifier shown in FIG. 11 is applied to a compensating circuit 642 comprising a parallel network consisting of a resistor 643 and a capacitor 644 and a series network consisting of a resistor 646 and an inductor 647. The output signal from tube 635 which has been developed across the compensating network 642 is propagated through a coupling capacitor 650 to a clamping circuit 652, which clamps the amplified video signal at a predetermined level for optimum operation of the television receiver 544. The clamping circuit 652 comprises a resistor 653, a capacitor 654, an inductor 655 and a diode 656. The substantially reduced supply voltage from line 614 is applied to the clamping circuit 652 through a resistor 657. The output signal from clamping circuit 652 is applied to the control grid of a video amplifier 660 of the television receiver 554 via a coupling capacitor 661, a line 662, selector switch 663 and a control grid resistor 664. Also connected to the resistor 664 is a capacitor 666 and a resistor 667. The resistor 653 may be a variable resistor to provide a suitable video gain control. However, if automatic video gain control is desired, the automatic gain control voltage from the television receiver 554 can be applied to the grid of tube 635 through resistor 636.

As is shown in FIG. 11, when the tape recording system is in the record position a selector switch 668 is connected to the plate electrode of tube 660 through a coupling capacitor 669, thereby applying video and synchronizing signals to the winding 551 through the transformer secondary winding 555. Also applied to the winding 551 is a high frequency bias signal from secondary winding 555 which cooperates with the high frequency biasing signal from transformer coil 571 in producing an effective bias field.

In the alternate embodiment of the amplifier circuit shown in FIG. 11 as described hereinabove, the component values are preferably as follows:

| COMPONENT | COMPONENT VALUE |
|---|---|
| Capacitors: | |
| 559 | 85 micromicrofarads |
| 578 | 0.15 microfarads |
| 584 | 50 microfarads |
| 587 | .02 microfarads |
| 593 | .047 microfarads |
| 596 | 50 micromicrofarads |
| 605 | .003 microfarads |
| 616 | 100 microfarads |
| 611 | 50 microfarads |
| 627 | .05 microfarads |
| 631 | .01 microfarads |
| 613 | 10 microfarads |
| 639 | 100 microfarads |
| 625 | 8 microfarads |
| 650 | .05 microfarads |
| 644 | 0.1 microfarads |
| 654 | 50 microfarads |

-Continued

| COMPONENT | COMPONENT VALUE |
|---|---|
| 661 | .25 microfarads |
| 669 | 4 microfarads |
| 560 | 5 micromicrofarads-80 micromicrofarads |
| Resistors: | |
| 562 | 24 K ohms |
| 581 | 10 K ohms |
| 582 | 10 K ohms |
| 580 | 150 K ohms |
| 583 | 1 K ohms |
| 586 | 18 K ohms |
| 589 | 3.3 K ohms |
| 595 | 12 K ohms |
| 602 | 270 ohms |
| 604 | 47 K ohms |
| 615 | 68 ohms |
| 607 | 47 K ohms |
| 608 | 65 K ohms |
| 609 | 22 K ohms |
| 628 | 4.7 K ohms |
| 636 | 150 K ohms |
| 638 | 60 ohms |
| 600 | 4.7 K ohms |
| 626 | 7.5 K ohms |
| 622 | 1 K ohm |
| 646 | 3 K ohms |
| 643 | 5 K ohms |
| 657 | 300 K ohms |
| 653 | 0–150 K ohms |
| 558 | 22 K ohms |
| 665 | 470 K ohms |
| Inductors: | |
| 590 | 250 microhenries |
| 601 | 250 microhenries |
| 629 | 250 microhenries |
| 632 | 500 microhenries |
| 647 | 100 microhenries |
| 655 | 250 microhenries |
| 561 | 250 microhenries |
| Transistor: | |
| 577 | 2N708 |
| Tubes: | |
| 592 | Pentode 6GM6 or 6CB6A |
| 635 | Pentode 6GM6 |

For optimum operation of the television receiver used with the tape recording system of the present invention, a synchronizing signal of sufficient amplitude and of proper phase is necessary to provide a uniform horizontal sweep signal for the deflection system. By way of example, and not by way of limitation, FIG. 12 shows a preferred modification of the horizontal control circuit of a Zenith television receiver Model No. 14L30 for the purposes of the present invention. Horizontal synchronizing pulses from a sync-pulse separator of the television receiver are applied to a line 700. These sync-pulses may have an amplitude of 50 volts negative. A record-playback selector switch 701 has one stationary contact thereof connected to the control grid of a triode tube section 703. The triode tube section 703 forms a part of the horizontal sweep oscillator circuit used in the television receiver. During playback operation, the negative horizontal synchronizing pulses on line 700 are applied to the control grid of tube section 703 through a capacitor 705, a resistor 706 and the selector switch 701 as indicated in FIG. 12. However, when the movable contactor of selector switch 701 is in the record position, the horizontal control circuit of FIG. 12 operates under relatively normal conditions to synchronize the horizontal sweep oscillator of the television receiver by means of broadcast signals received from a television transmitting station.

During playback operation of the system, the negative synchronizing signal from the sync-separator is also applied to a phase detector 708, comprising a pair of end-to-end diodes 710 and 711, a pair of resistors 713 and 714, and a capacitor 715. An input capacitor 716 is connected between the line 700 and a terminal point 717, and capacitors 718 and 719 are connected between the anodes of the respective diodes 710 and 711 and ground potential.

The diodes 710 and 711 are preferably of a configuration used by certain manufacturers of television receivers, that is, two diodes in a single container having their cathodes connected together and a lead connected intermediate the cathodes to provide a single encapsulated unit having three leads extending therefrom. The symbol used in FIG. 12 represents such a three terminal unit. However, it can be seen that two individual diodes can be used in the horizontal control circuit of FIG. 12 by connecting their cathodes together and to terminal point 717.

To increase the speed of response of the horizontal control circuit, a capacitor 721 is connected in the circuit and has one end thereof connected to the switch 701 and the other end thereof connected to the output of the phase detector 708 at a terminal point 722. The capacitor 721 is shunted by a resistor 725 through the selector switch 701, while one end of resistor 725 is connected to ground through a first series network consisting of a resistor 726 and a capacitor 727 and through a second series network consisting of a resistor 728 and a capacitor 729. The tube section 703 has the cathode electrode thereof connected to ground potential while the plate electrode thereof is connected to a direct current supply potential through a plate load resistor 730.

The output of tube section 703 is applied to the control grid of a pentode tube section 733 through a pair of capacitors 734 and 735. The tube section 733 forms the other part of the horizontal sweep oscillator of FIG. 12. A portion of the direct current bias developed on the grid of the pentode 733 is fed back to a terminal point intermediate resistor 726 and capacitor 727 through a resistor 737. From a point intermediate capacitors 734 and 735 the output signal of tube 703 is also applied to a tuned circuit 738 consisting of a capacitor 740 and an inductor 741. The tuned circuit 738 is also connected to the grid electrode of pentode 733 through a resistor 743. The cathode of pentode 733 is connected to ground potential through a portion of inductor 741, which is defined by a tap 745, thereby providing the necessary feedback to the tuned circuit to sustain oscillation thereof. The screen grid electrode of pentode 733 is connected to a positive voltage which is somewhat less than the positive voltage applied to the plate electrode of the same tube. The plate electrode of the oscillator tube section 733 is connected to a voltage source, one having a potential of about 600 volts DC, through a plate load resistor 747. A wave form shaping circuit consisting of the resistor 747, a capacitor 748 and a resistor 749 forms a sawtooth wave for driving the horizontal output tube to which the circuit is coupled by means of capacitor 751.

Indicated at 753 is a portion of a flyback transformer incorporated in the horizontal deflection system of the television receiver. Highly positive pulses of approximately 300 volts are generated at winding 753*a* *a*of the flyback transformer 753. Winding 753*a* is connected to a terminal point 754 of the phase detector 708 through a line 755 and a parallel network consisting of a capacitor 756 and a resistor 757.

The operation of the horizontal control circuit of FIG. 12 when the selector switch 701 is in the record position is virtually unchanged from that which the manufacturer had intended for receiving television signals which have been transmitted by a television transmitting station. However, when the selector switch 701 is in the playback position, as shown in FIG. 12, the speed of response of the horizontal control circuit is greatly increased to enable compensation for any high speed flutter in the motion of the record medium. The positive 300 volt pulses from flyback transformer 753 represents the horizontal oscillator sweep frequency and this is compared by the phase detector 708 with a synchronizing pulse applied to the phase detector from line 700. If the horizontal sweep oscillator of FIG. 12 tends to run too fast, the phase comparison circuit 708 causes the control grid of tube segment 703 to become more positive which, in turn, increases the effectiveness of capacitor 734, which is shunted across the oscillator tuning capacitor 740 through the plate to cathode circuit of the segment 703. The increased tuning capacitor tends to decrease the oscillator frequency in a corrective manner to the synchronizing frequency of the horizontal synchronizing pulses applied to line 700.

To provide proper compensation for flutter in the tape recording system, the capacitor 721 and resistor 728 are incorporated. These components enable the grid electrode of tube segment 703 to sense the effect of phase errors between the 300 volt pulses from the flyback transformer 753 and the 50 volt negative pulses from the sync-separator circuit almost immediately. To further increase the speed of response to phase errors, it is preferable that the capacitor 705 and resistor 706 be connected between the line 700 and the grid electrode of tube segment 703 for superimposing a direct trigger pulse through the horizontal control tube 703 and therefrom to the grid electrode of horizontal oscillator tube section 733. A change in phase of the pulse from phase detector 708 will immediately affect the discharge point of the horizontal oscillator to give a higher speed correction of flutter in the tape recording system. For optimum stability of horizontal control circuit in FIG. 12 the ratio R1/R2 should preferably equal the ratio C2,/C1 where $R_1$ and $R_2$ refer to the resistance values of resistors 706 and 728 and C1 and C2 refer to the capacitance values of capacitors 705 and 729.

The horizontal control circuit of FIG. 12 has great economy since only two resistors and two capacitors are required to modify the original horizontal control circuit of the television receiver. The added resistors are resistor 706 and resistor 728, while the added capacitors are capacitor 705 and capacitor 729. In some instances, it may be desirable to reduce the values of capacitors 718 and 719 to further increase the speed of response of the horizontal control circuit.

In the horizontal control circuit of FIG. 12 the component values are preferably as follows:

| COMPONENTS | COMPONENT VALUES |
|---|---|
| Capacitor 705 | 100 micromicrofarads |
| Capacitor 715 | 51 micromicrofarads |
| Capacitor 716 | 51 micromicrofarads |
| Capacitor 718 | 390 micromicrofarads |
| Capacitor 719 | 390 micromicrofarads |
| Capacitor 721 | 200 micromicrofarads |
| Capacitor 727 | .047 microfarads |
| Capacitor 729 | 470 micromicrofarads |
| Capacitor 734 | 1000 micromicrofarads |
| Capacitor 735 | 470 micromicrofarads |
| Capacitor 740 | 3300 micromicrofarads |
| Capacitor 748 | .005 microfarads |
| Capacitor 751 | .005 microfarads |
| Capacitor 756 | 4.7 micromicrofarads |
| Resistor 713 | 330 K ohms |
| Resistor 714 | 330 K ohms |
| Resistor 706 | 750 K ohms |
| Resistor 725 | 1 megohm |
| Resistor 726 | 150 K ohms |
| Resistor 728 | 150 K ohms |
| Resistor 743 | 100 K ohms |
| Resistor 730 | 68 K ohms |
| Resistor 737 | 10 megohms |
| Resistor 747 | 120 K ohms |
| Resistor 749 | 12 K ohms |
| Resistor 757 | 150 K ohms |
| Tube segments 703 and 733 | Type 6 KD8 |

Still another method of reducing the effects of flutter in the tape recording system of the present invention is shown in FIG. 13. Here a compensating signal is applied to the beam deflection circuit of the television receiver for correcting the beam deflection signal. Negative horizontal synchronizing pulses are applied to the horizontal deflection circuit of FIG. 13 through a line 800 and therefrom to a balanced phase detector 801 through a capacitor 802. The balanced phase detector 801 consists of a pair of end-to-end diodes 805 and 806, a pair of resistors 807 808 shunting the diodes 805 and 806 respectively, a capacitor 809, and a pair of capacitors 811 and 812 connected between the anodes of the respective diodes 805 and 806 and ground potential.

The output of phase detector 801 is applied to the control grid of a tube 815 through a variable resistor 816. Connected to one end of variable resistor 816 is a resistor 817 which is connected to a negative bias supply. The variable resistor 816 and resistor 817 form a voltage divider network which provides the necessary width control of the horizontal sweep signal from tube 815. A filter capacitor 819 is connected between a point intermediate the variable resistor 816 and fixed resistor 817, and ground potential thereby preventing high frequency signals from appearing across the negative bias supply. The cathode and suppressor grid of tube 815 are connected to ground, as shown in FIG. 13, while the screen grid electrode of tube 815 is connected to a positive voltage which is of some potential less than the supply potential applied to the plate of the same tube.

The horizontal sweep signal from the output of tube 815 is applied to a primary winding 821 of an output transformer 822. Connected between the primary winding 821 and supply terminal 824 is a filter capacitor 825 for preventing high frequency signals from appearing across the supply. A secondary winding 827 of the transformer 822 has one end thereof connected to a capacitor 828 while the other end of winding 827 is connected to a high voltage positive supply through terminal 829. Also connected to the terminal point 829 is one end of a flyback transformer 831 and one lead of a capacitor 832, while the other lead of capacitor 832 is connected to capacitor 828 and to the horizontal deflection yoke 835. Connected between a tap 836, of the deflection yoke 835, and one end of the deflection yoke 835 is a capacitor 837. The capacitor 837 and the horizontal deflection yoke 835 are connected to a tap 839 on the flyback transformer 831 through a line 840.

The upper lead of the horizontal flyback transformer 831 is connected to a high voltage rectifier, not shown, the output of which supplies the necessary high voltage for the picture tube of the television receiver. A lead 843 from the flyback transformer 831 is connected to the damper circuit of the television receiver, while a lead 844 of the flyback transformer 831 is connected to the horizontal output circuit of the television receiver.

The signal to be compared with the horizontal synchronizing pulses applied to line 800 is derived from a winding 846 on the flyback transformer 831 and positive pulses therefrom, corresponding to the horizontal oscillator frequency, are applied to the phase comparator circuit 801 through a line 847 and a parallel network 848 consisting of a capacitor 849 and a resistor 850. As the phase comparator 801 senses a difference in phase relationship between the two horizontal rate signals applied thereto, the charge on capacitor 811 will vary thereby changing the bias applied to the grid electrode of tube 815 which, in turn, will vary the amplitude of the compensating signal applied to the output transformer 822.

Although the flutter compensation circuit shown in FIG. 13 is more complex than that shown in FIG. 12, it can be used in television receivers in which flutter compensation such as provided by capacitor 721 in FIG. 12 is impractical. The flutter compensating circuit shown in FIG. 13 is preferably used in addition to a usual horizontal control circuit, or in addition to a modified horizontal control circuit such as illustrated in FIG. 12. Where the control circuit of FIg. 12 is also utilized, the critical resistance and capacitance values for the components of FIG. 13 may be chosen to complement the deficiencies of the other control circuit. For example the circuit of FIG. 13 can respond to the higher range of flutter frequencies above the range that is controlled by the control circuit of FIG. 12. by way of example in the embodiment of FIg. 13, capacitor 832 may have a value of 0.15 microfarads while capacitor 828 may be a five thousand microfarad low voltage electrolytic capacitor.

The curves 675 and 676 in FIG. 9 illustrate the relative phase of the signals obtained for example from the coils 402 and 401, respectively, of the magnetic core 400, FIG. 10, as a function of frequency. The same relationship preferably applies to the playback heads of the other embodiments. Curve 680 shows the desired characteristics of the playback amplifier for providing a zero phase difference at the output of the head - amplifier system over the frequency range of interest. The curve 675 may represent the response of a winding such as 402 having 1,000 turns where the curve 676 represents the phase relationship for a winding such as 401 having 200 turns.

In FIG. 9A, curve 683 represents the output from a coil such as 402 as a function of frequency while curve 684 represents the output amplitude from a coil such as 401 as a function of frequency, of course assuming a constant amplitude input to the head 400. The dash line 685 indicates in a general way the total response of the windings 401 and 402 together in the frequency range between the resonant frequency of coil 402 indicated by the vertical mark 686 and the resonant frequency of the coil 401 indicated by the vertical mark 687. It will be observed that the output amplitude is substantially higher than would be the case with the coil 402 alone.

As indicated by comparison of FIGS. 9 and 9A, the phase reversals of curves 675 and 676 occur at the respective resonance frequencies of the coils (where the amplitude of the signals induced in the coils is at a maximum). The region 678 of the curve 675 corresponds to the resonant frequency of the coil 402, for example, while the region 679 of curve 676 corresponds to the resonant frequency of the coil 401.

In the compensating circuit 452 at the output of transistor 443, FIG. 10, for example, the inductor 458 in conjunction with capacitor 455 is especially selected to provide a phase reversal in curve 680 at the resonance frequency of winding 402 as indicated at 682. The relative values of resistor 457, capacitor 455 and inductor 458 are critical for proper amplitude and phase correction. The resistor 457 and capacitor 455 may be provided with a trimmer adjustment means so as to adjust the frequency and amplitude characteristics at region 682 of curve 680. Also, the inductor 458 may be provided with a trimmer adjustment so as to be adjustable to a precise value giving the optimum changeover frequency in coincidence with the phase shift obtained by the coil 402.

To illustrate another means for compensating for phase reversal of signals from the transducer head, the capacitor 596 and resistor 595 in conjunction with inductor 601 and resistor 600, in the input circuit of tube 592, FIG. 11, will control location locaation of the region 681 of the curve 680.

Referring to FIG. 10, the primary winding 425*a* of transformer 425 is preferably part of the tank circuit of the oscillator 426. The primary winding 425*a* and the capacitor 423 are tuned to resonate at the frequency of operation of the oscillator 426 and are brought close to the head core 400 so that the secondary circuit including secondary winding 425*b* and cross field conductor 429 may have substantially the minimum practical impedance. In other words, the leads connecting the secondary winding 425*b* and the cross field conductor 429 have a minimum length, the long leads being in the primary circuit between the tank circuit and the remainder of the oscillator indicated at 426.

It has been found advantageous, although optional, to connect a capacitor 930 across resistor 411. The capacitor 930 when employed is connected across the winding 402 during playback.

by way of example, capacitor 930 may have a value of 35 micro microfarads.

During recording operation, a resistor 412 is connected across the winding 402. Resistor 412 may have a value of 22,000 ohms, for example.

In FIG. 10 if the head characteristics are controlled closely taking into account the effect of resistors 410 and 411 and capacitor 930, if present, the values of capacitor 455, resistor 457 and inductor 458 may be fixed at appropriate values relative to such head characteristics and trimmer components omitted.

The parallel network of inductor 483 and resistor 484 in the circuit of FIG. 10 are preferably selected to provide a high frequency series peaking circuit.

In the circuit of FIG. 10, during playback operation, the output of the playback amplifier is supplied via a capacitor 666 and a resistor 667 to a conventional automatic gain control circuit 933 which may be that of the Zenith 14L30 Chassis previously referred to. The plate of the automatic gain control section of the automatic gain control and sync.clip tube of said 14L30 Chassis (Type 6HS8may be connected to lead 935 indicated in FIG. 10 which leads to one contact of a switch 937. A capacitor 938 is connected between line 935 and a line 939 of the circuit. When the switch 937 is in its upper position, the lower end of resistor 488 is grounded, while when the switch 937 is in the lower position, the lower end of the resistor 488 is connected to line 935 to receive gain control signals from the automatic gain control circuit 933 of the television set 404.

The clamping circuit of FIG. 10 has the following features:

1. It provides bias for the video amplifier tube 416 of the television set 404.
2. It allows transients in the signal to pass without substantial rectification. Such rectification would cause picture and sync. distortion.
3. The clamping circuit is non-critical as to shift in clamping interval due to flutter in the signal reproduced from the record medium.
4. The circuit operates stably in conjunction with the flutter stabilizing circuit of FIG. 12.
5. The circuit uses a minimum of inexpensive parts.
6. The circuit does not require additional transformers, amplifier stages, delay lines, trigger circuits or the like.
7. The clamping circuit does not shift the picture portion of the signal appreciably or require a special setting of the horizontal operator hold control (controlling the inductance of inductor 741, FIG. 12) for playback as compared to normal operation of the television set 404.

The circuit point indicated at 942 in FIG. 10 within the television set 404 is connected with a source of 250 volts d.c. voltage through variable resistor 965 (FIG. 11) which may have a value of about 1 to 5 megohms, a 120,000 resistor 966, and a 22,000 ohm resistor 967. A further resistor is indicated at 944 in FIG. 10 in shunt with the branches of the clamping circuit 502. Resistor 944 may have a value of 300,000 ohms to provide a net shunting resistance of about 250,000 ohms taking into account the loading of resistor 944 by the components within the television set 404 previously referred to. The value of resistor 944 of 300,000 ohms is selected where capacitor 498 has a value of 0.003 microfarads, inductor 499 has a value L1 of 6.2 millihenries, resistor 505 has a value of 470,000 ohms, capacitor 506 has a value of 0.047 microfarads, resistor 508 has a value of 22,000 ohms and the pulses from the output transformer 511 via winding 510 have peaks of minus 7 volts occurring at the horizontal line rate.

Components 503, 499 and 506 of the first branch of the clamping circuit 502 may be in series in any sequence. Resistor 505 may be placed across inductor 499 and capacitor 506 instead of across capacitor 506 only. In the second branch of the clamping circuit components 507 and 508 may be interchanged in position in the circuit. Resistor 505 and capacitor 506 may be omited (shorted out) if a bias voltage is not required for the video amplifier stage 416.

The foregoing examples of specific values of the various components of the clamping circuit and of various rearrangements and modifications are, of course, by way of example only and not by way of limitation.

In operation of the circuit of FIG. 10 in the playback mode, the winding 510 of output transformer 511 of the television set 404 supplies a waveform as indicated at 946. The seven volt negative peaks of the waveform occur at the line rate and produce a negative current flow through the series circuit including components 508, 507, 499, 503, and components 505 and 506 in parallel. Circuit point 947 in FIG. 10 becomes negatively charged with respect to ground by approximately 2.5 volts. Circuit point 948 is momentarily driven to about minus 2.75 volts due to the negative current pulse through diode 503. Circuit point 947 remains essentially at minus 2.5 volts at all times, while circuit point 948 drops to minus 2.5 volts after the negative current pulse has terminated. The presence of diode 503 clamps circuit point 948 which is directly coupled to the grid of tube 416 in the television set to 2.5 volts negative at the end of the negative actuating pulse of current produced by the peaks of the waveforms 946. The end of each actuating pulse occurs approximately at the end of the horizontal blanking period, after which a positive going picture signal is transmitted through coupling capacitor 498. The picture signal can change the potential of circuit point 948 in a positive direction up to a potential of zero volts at which diode 507 becomes conducting. Similarly the signal is not restricted if it does not swing below minus 2.5 volts. Thus picture signals up to 2.5 volts peak potential can be accommodated. Each horizontal line of the picture signal starts with respect to a minus 2.5 volt reference potential which is established by the clamping circuit at circuit point 948. The bias or reference potential may be made more negative by increasing resistor 505, by decreasing the value of resistor 508, or increasing the amplitude of the pulse voltage waveform 946; and the bias or reference potential may be made less negative by opositely changing the aforementioned values. The inductance of inductor 499 offers a high impedance to composite signal transients which are present in the type of video system described (due to high frequency emphasis, phase shifts, etc.) thus minimizing rectification by diode 503. Rectification by diode 503 would otherwise cause distortion and sync. shift. The inductance 499 also reduces clipping of the sync. peak amplitudes when the clamping circuit 502 is actuated at time intervals corresponding to the back porch of the video waveform.

A resistor for example having a value of 5,000 ohms may be used in place of inductor 499, but the inductor has been found to give better results. Resistor 508 has an effect for positive peaks of the composite video signal similar to that provided by inductor 499.

The resistor 944 together with the parallel resistance of the television circuit 404 discharges coupling capacitor 498 to some extent during the line scan interval. A time constant of about 750 microseconds for capacitor 498 and its discharge resistance including resistor 944 is a good compromise, (corresponding to the product of 250,000 ohms and 0.003 microfarads), with a range from 200 to 2,000 microseconds being practical. The discharge circuit provided by the resistance including resistor 944 reduces low frequency noise, shades the picture and has been found to reduce distortion and sync. shift.

The degree of clamping action may be increased by reducing the value of resistor 508 or by increasing the pulse peaks of waveform 946, the value of resistor 505 being reduced correspondingly to maintain the specified bias.

The proportions set forth in the above example have been found advantageous, since too strong a clamping action may affect the sync, adversely by suppressing the vertical sync. for example.

The clamping circuit of FIG. 10 may be inverted and positive pulses supplied by means of a winding such as 510 if clamping of a negative going picture signal is desired.

The resistor 412 which may have a value of about 22,000 ohms is shown as an alternative to short circuiting the winding 402 which has the relatively large number of turns,, during the recording operation.

Referring to FIg. 10, and particularly to the television circuit 404 utilized during recording operation, it will be observed that resistor 664 associated with the grid of tube 416 is connected with certain components of the television circuit only when the selector switch 428 is in the record position. These components associated with line 430 have been indicated as comprising the detector circuit 950 which is a standard part of chassis 14L30 and has its input 951 connected to the third I.F. stage of Chassis 14L30. Line 430 is also connected to component 953, 954 and 955 of Chassis 14L30. In Chassis 14L30, resistor 953 has a value of 1,500 ohms and resistor 955 has a maximum value of 2,500 ohms. The television set is in condition for normal operation whenever switch 428 is in the record position, whether or not switch 418 is also actuated to record position. A broadcast television signal may be viewed on the television set 404 whenever switch 428 is in the record position, and the received broadcast signal may be simultaneously recorded on the record medium 11 when switch 418 is in the record position also.

In Chassis 14L30 output line 958 of the video amplifier 416 is connected to the cathode ray tube of the set 404 without further amplification stages.

Referring to FIg. 10, the tank circuit comprising capacitor 423 and transformer 425 may be tuned to the bias frequency which, for example may be 2.75 megacycles per second.

Referring to FIG. 10, resistor 481 may typically have a value between 3,000 ohms and 10,000 ohms. capacitor 482 may be adjustable between 0.001 microfarads and 0.5 microfarads to correct for various individual heads associated with the circuit of FIG. 10. In other words capacitor 482 may be adjusted to take account of manufacturing tolerances and the like in the manufacture of individual heads as generally illustrated, for example, in FIG. 1, FIG. 6 or FIG. 10 and associated with the circuit of FIG. 10.

With respect to the circuit of FIG. 10 where clamping is to occur at the back porch of the composite video signal, it is desirable to increase the intensity and/or width of the pulses supplied to the clamping circuit 502 from the winding 510 during the vertical sync. intervals, thereby keeping the sync. level of the clamped composite picture signal more nearly constant.

Referring to the circuit of FIG. 11, the movable plate of capacitor 560 is preferably grounded. Capacitor 560 and inductor 561 are tuned to the frequency of the high frequency bias oscillator component 568 to keep the high frequency bias signal out of the circuits of the television set 554. By way of example, capacitor 560 and inductor 561 may be resonant at 2.75 megacycles per second where this is the frequency of oscillator component 568.

A resistor 960 which may, for example, have a value of 500,000 ohms is preferably connected between the record terminal of selector switch 668 and ground.

In the circuit of FIG. 11, resistor 600 may be omitted, depending on the compensation characteristic required.

The resistor 653 in FIG. 11 is used mainly for adjusting the low frequency phase shift (although it does affect the gain of the video circuit).

In one embodiment in accordance with FIG. 11, capacitor 605 had a value of 0.003 microfarads while resistor 602 had a value of 270 ohms, giving a time constant of 0.81 microseconds. This represented the minimum time constant for the various compensating circuits of the specific embodiment. Capacitor 605 may, however, have a value as low as from about 0.001 to 0.002 microfarads.

Various components of the conventional circuit identified as the 14L30 Chassis have been indicated in FIG. 11 including a resistor 962 and capacitor 963 in the cathode circuit of tubes 660, and resistance elements 965, 966 and 967 leading to a source of B+ voltage (supplying a voltage value of 250 volts D.C. Resistor 967 and the B+ source connected therewith are bypassed by a 4 microfarad capacitor (not shown).

Referring to FIG. 12, a capacitor 970, a resistor 972 and a diode 973 are indicated as being connected to the input line 700 of the circuit. This circuit when interposed between the minus 50 volt sync. pulses and the horizontal control circuit attenuates the vertical pulses which otherwise tend to affect the modified control circuit of FIG. 12 during the vertical blanking interval. The original circuit of Chassis 14L30 responds too slowly for the vertical pulses to change its frequency appreciably.

In FIG. 12, componenst 737, 726 and 727 serve to supply negative bias voltage to the grid of tube section 703, this negative bias being tapped from the negative grid voltage of the oscillator section 733. It will be understood by those skilled in the art that the tube section 703 serves as a reactance tube for controlling the oscillator frequency of the oscillator tube section 733. Section 733 is a Hartley type sine wave oscillator, with coil 741 tapped at 745 and a capacitor 740 forming the frequency determining circuit tuned to approximately 15,750 cycles per second. A movable permeable core in the coil 741 enables trimming of the frequency, this core being moved by the "horizontal hold" knob of the television set. The upper part of coil 741 is coupled to the grid of tube section 733 through capacitor 735, with a grid leak resistor 743, for example of 100,000 ohms, developing the negative bias. Resistor 737 may have a value of 10 megohms, for example. The lower part of the coil 741 which is grounded forms part of the anode or screen portion of the oscillator circuit, with the cathode connected to 745 being at an intermediate potential.

With respect to the relationship R1/R2 should preferably equal C2/C1 as previously mentioned with respect to FIG. 12, it should be understood that the presence of resistance 2726 and capacitor 727 will modify this relationship to some extent.

Where the values of capacitors 718 and 719 have been reduced compared to their values in the 14L30 Chassis, the decreased values have been found to have negligible effect on the normal operation of the television receiver when the switch 701 is in the upper record or inactive position.

Although it is most economical to use a modified circuit such as that indicated in FIG. 12 in the television set as indicated, a separate horizontal stabilizing circuit along the lines of that shown in FIG. 12 may be utilized instead. As previously indicated resistor 743 is a grid leak resistor and does not have much couplIng effect between coil 741 and the grid of tube section 733.

The electric circuitry utilized during recording and playback corresponded to that illustrated in FIGS. 11 and 12 except that the clamping circuit of FIg. 10 was utilized in place of the clamping circuit of FIG. 11. More specifically, the component of FIG. 11 between points 980, 981 and 982 where omitted, and the clamping circuit arrangement beyond point 984 in FIG. 10 substituted therefore. The components 944, 515, 516 of FIg. 10 as well as the components 510 and 511 from FIG. 10 were also utilized. The automatic gain control line 935 was not, however, utilized in the demonstration apparatus. The recording circuit including components 669, 960, 560 and 561 of FIG. 11 were utilized in the demonstration apparatus instead of the corresponding component of FIg. 10.

In the modified embodiment of the amplifier circuit of FIg. 11 which has been adopted for demonstration purposes, the component values are preferably as follows:

| COMPONENT | | COMPONENT VALUE |
|---|---|---|
| Capacitor | 559 | 85 micro microfarads |
| Capacitor | 560 | 5–80 micro microfarads |
| Capacitor | 578 | 0.15 microfarads |
| Capacitor | 584 | 50 microfarads |
| Capacitor | 587 | .02 microfarads |
| Capacitor | 593 | .047 microfarads |
| Capacitor | 596 | 50 micro microfarads |
| Capacitor | 605 | .003 microfarads |
| Capacitor | 616 | 100 microfarads |
| Capacitor | 611 | 50 microfarads |
| Capacitor | 627 | .05 microfarads |
| Capacitor | 631 | .01 microfarads |
| Capacitor | 613 | 10 microfarads |
| Capacitor | 639 | 100 microfarads |
| Capacitor | 625 | 8 microfarads |
| Capacitor | 644 | .1 microfarads |
| Capacitor | 669 | 4 microfarads |
| Resistor | 562 | 24 K ohms |
| Resistor | 581 | 10 K ohms |
| Resistor | 582 | 10 K ohms |
| Resistor | 580 | 150 K ohms |
| Resistor | 583 | 1 K ohm |
| Resistor | 586 | 18 K ohms |
| Resistor | 589 | 3.3 K ohms |
| Resistor | 595 | 12 K ohms |
| Resistor | 602 | 270 ohms |
| Resistor | 604 | 47 K ohms |
| do. | 615 | 68 ohms |
| do. | 607 | 47 K ohms |
| do. | 608 | 65 K ohms |
| do. | 609 | 22 K ohms |
| do. | 628 | 4.7 K ohms |
| do. | 636 | 150 K ohms |
| do. | 638 | 60 ohms |
| do. | 626 | 7.5 K ohms |
| do. | 622 | 1 K ohm |
| do. | 646 | 3 K ohms |
| do. | 643 | 4.7 K ohms |
| do. | 558 | 22 K ohms |
| Inductor | 590 | 250 microhenries |
| do. | 601 | 250 microhenries |
| do. | 629 | 250 microhenries |
| do. | 632 | 500 microhenries |
| do. | 647 | 100 microhenries |
| do. | 561 | 100 microhenries |
| Transistor | 577 | 2N708 |
| Tube 592 | | Pentode 6GM6 or 6CB6A |
| Tube 635 | | Pentode 6GM6 or 6CB6A |

(Parts from FIG. 10 substituted in place of Parts 650, 654, 661, 653, 657, 656, 655, 665 in FIG. 11)

-Continued

| COMPONENT | COMPONENT VALUE |
|---|---|
| Capacitor 506 | .047 microfarads |
| Capacitor 498 | .003 microfarads |
| Capacitor 656 | .01 microfarads |
| Resistor 508 | 22,000 ohms |
| Resistor 505 | 470,000 ohms |
| Resistor 515 | 4,700 ohms |
| Resistor 667 | 68,000 ohms |
| Resistor 664 | 330 ohms |
| Inductor L1 | 6.2 millihenries |
| Inductor 516 | 250 microhenries |
| Diode 503 | IN34A |
| Diode 507 | IN34A |
| Inductor L2 | omitted |

It will be noted that in the actual demonstration circuit, resistor 600 of FIG. 11 is omitted.

The playback frequency response for the demonstration apparatus including the head (but not the tape) was flat from about 16 kilocycles per second to the resonant peak frequency of the head, the response thereafter rising at an increasing rate to the upper useful frequency limit of the system. Thus, the playback frequency response was flat from about 156 kilocycles per second to apporximately 300 kilocycles per second, the response thereafter rising at an increasing rate to approximately 2 megacycles per second. The head had irregularities (peaks and valleys) in its response curve due to pickup at points other than the main gap (such as edges of the head core) and the dimensions of ththe head core were such that these irregularities occurred at frequencies below 15,750 cycles per second. In the demonstration apparatus, the clamp circuit of FIG. 10 operated with a signal polarity such that the sync. pulses were negative. Of course the clamp circuit can be reversed for an opposite polarity signal.

To illustrate the flutter reduction obtained in the demonstration apparatus using the circuit of FIG. 12, the following tabulation may be given indicating generally the results observed.

| Flutter Frequency, Cycles Per Second | Ratio of Reproduced Flutter with Circuit of FIG. 12/Flutter with Original Circuit in same TV Set |
|---|---|
| 10 | 0.14 |
| 20 | 0.13 |
| 30 | 0.06 |
| 60 | 0.05 |
| 120 | 0.07 |
| 180 | 0.12 |
| 300 | 0.15 |
| 600 | 0.23 |
| 900 | 0.50 |
| 1200 | 0.75 |
| 3000 | 0.80 |
| 10,000 | 0.80 |

The playback circuit of the demonstration apparatus including the head provided a substantial useful low frequency response down to at least about 800 cycles per second. The response below this relative low frequency drops off at an increasing rate which reaches a rate higher than 6 desibles per octave. There is a substantial boost in low frequency response in the region between about 800 cycles per second and about 8,000 cycles per second. Thus there is a substantial boost in low frequency response at frequencies directly above the low frequency cutoff value of about 800 cycles per second.

It will be observed that the time constant for capacitor 721 and resistor 728 in FIG. 12 is about 30 microseconds. The time constant for capacitor 706 and resistor 706 is about 75 microseconds. The time constant for capacitor 719 and resistor 714 is about 130 microseconds, and the time constant for capacitor 718 and resistor 713 is about 130 microseconds also. Capacitor 729 and resistor 728 have a time constant of about 75 microsecond, matching 705 and 706.

In the demonstration apparatus it is considered that the time constant provided by capacitor 721 and resistor 728 is of greatest importance.

It has been found that interference between the high frequency bias and the television picture signal during recording is reduced if the bias oscillator frequency is adjusted to certain exact values where beats are mnimized. (For this reason capacitor 432 in FIG. 10 is preferably a variable capacitor.)

In general the time constants of thte correction networks in the various embodiments are considered of substantial importance and the illustrated values given herein represent good choices for such time constants.

Compensation is preferably provided in the earliest stage as in FIGS. 10 and 11 to prevent distortion of high level signals by the amplifier. Although the equalizing circuits in FIG. 10 and 11 resemble video amplifier coupling networks in some respects, the values of resistance, capacitance and inductance chosen for the illustrated circuits as given herein are widely different from conventional video amplifier circuits, and give sharp changes in frequency response over the useful spectrum; in contrast to a relatively flat response which is the objective of ordinary video compensating networks.

The time constants chosen in FIGS. 10, 11 and 12, for example, are uniqaue and important for television recording and the like.

It is contemplated that the demonstration apparatus may be successfully operated at a lower speed such as 60 inches per second, for example.

In the circuit of FIG. 10 diode 507 may be shorted out.

Compensation for flutter may be effected by using the output of a discriminator or frequency comparison circuit as in FIG. 13 or FIG. 12 to control the width of the horizontal scan in the display tube, as by narrowing the width when the playback is too slow, and increasing th width when the signal is too fast. The width may be controlled by modulating the screen voltage of the horizontal output tube, or by modulating the high voltage aplied to the display tube, according to the input from the frequency comparison circuit.

In FIG. 11 the circuit point *b* common to 650 and 651 assumes a positive potential with respect to ground, depending on the potential of 614 aznd the relative values of 657 and 653. Capacitor 654 also assumes practically the same potential. The composite video and negative going sync. applied to this circuit point *b* through 650 may swing the circuit point *b* in the positive direction with minimum loading since this places are reverse voltage across diode 656. However when the signal swings in the negative direction, diode 565 becomes conducting and offers a low impedance to ground through 654. The signal is thus clamped at its negative sync. level.

Rectification of the negative sync. tips lowers the potential of 654 (and of *b*) momentarily, but 654 regains its charge through 675 during the interval between sync. pulses. The discharge rate of point *b* through 653 is nearly inpedenent of the signal because it is determined mainly by the bias which is added to the signal. The bias may be five to ten times as great as the signal, or even higher. This arrangement gives a clamping action independent of variations in the picture, especially in portions of the cycle where the signal is becoming more positive; and provides uniform shading of the picture. The degree of discharge may be regulated b adjustment of 654. Inductor 655 minimizes clipping the leading edge of the sync. pulses. Coupling network 661, 665 transfers the clamped signal to the TV set without substantial distortion.

The recording circuits are essentially flat to below 10 cycles per second in voltage response, with negligible phase shift to below 60 cycles per second. At low and medium frequencies the picture voltage waveform including normal sync. pulses is transformed faithfully into a current waveform by 558, 421, or 163; into a magnetic flux waveform by head 550, 400 or 100; and recorded as a variation in flux on tape 11.

At the highest frequencies, capacitors 559, 420, 158, and 162 compensate for shunt capacity of the head, impedance rise in its windings, core losses, losses in the recording circuits, etc. to maintain the recording fluxc wave as a faithful reproduction of the composite signal.

A preferred condition of recording head response is when the voltage across the head winding rises in direction proportion to frequency at frequencies high enough so that head winding resistance is negligible compared with its reactance. when this condition is achieved the current in the heads described in this specification rises with frequency ot a certain degree.

The 6GM6 tube is suitable for A.G.C. operation, as its amplification varies with grid bias.

The demonstration apparatus used a hysteresis synchronous type capstan motor.

As an alternative to driving the head from the output of the TV set video amplifier, the amplifier in the recorder could be used for this purpose. For example, during recording the grid of 635 can be connected to the TV set at its video detector or to the cathode circit of tis video amplifier, or to its late circuit through a step down voltage divider. Line 553 would then be connected to the plate circuit of 635 during recording, instead of to the plate circuit of the TV set video amplifier. This arrangement reduces laoding of the TV video amplifier, eliminates some connections, and reduces the impedance level of the signals in the cable.

While the audio pole pieces have been illustrated as directly recording the audo frequencies, they can be used instead for recording a carrier modulated by the audio signal, which carrier would be demodulated for playback.

In place of the vacuum tubes, transistors could be used with out altering the function of the associated circuits.

The neon lamp is actuated well in advance of the tape and remains lit, so that during recording the operator may choose an appropriate reversal point depending upon the program material. A relay should operate automatically before reaching the very ends of the tape in case the operator neglects the changeover. During playback the reversals preferably take place automatically at the points where changeover was made in the recording process.

In regards to reducing the reflucted capacitance across the head to the lowest possible value; it may be desirable to omit 458 and/or 466 and obtain an equivalent effect elsewhere in the circuit.

If no additional grid bias is desired from the clamping circuit, 505 may be reduced to zero, and 506 eliminated.

A.G.C. line 935 may similarly be connected to 468, or to both 468 and 488.

The following are objects of the invention:

1. Circuit and head combination that gives high output and signal-noise ratio even with a very narrow track width, allowing more tracks on a given width of tape.

2. Simple circuits that give adequate correction for video (and radar) recording, using direct recording.

3. Faithful reproduction of recorded waveforms over a video frequency spectrum.

4. Economy of tape usage as well as of mechanism and of circuitry to give a practical home recorder for video.

5. Stabilization of picture signal that enables the use of an inexpensive drive.

5. Stabilization that tolerates considerable flutter during recording and/or playback.

7. Treatment of signal that compensates for defects in the magnetic recording and/or playback process of a video signal including hum pickup, inherent tape noise, amplifier noise, deficiencies of heads an tapes, rate of change playback effects, phase shifts, etc.

8. Reproduction of a steady picture from a video signal wich has a relatively high degree of frequency or amplitude modulation due to drive instability.

The time constants of the RC and L networks in the amplifier circuits of FIG. 7, 10 and 11 and in the stabilizing circuits of FIGS. 12 and 13 are important in producing the desired results in recording and reproduction of the picture. These may be calculated readily from the tabulated values, and important limits of these re indicated in some of the appended claims.

It will be apparent that many modifications and variations may be effected without departing from the scope of the novel concepts of this invention.

General Discussion of the Claimed Features

In the first figure of U.S. Pat. No. 3,596,008, the resonance frequency of the playback system is about 100 kilohertz as illustrated in FIG. 8B. The phase error in the vicinity of this resonance frequency is as illustrated by curve 675 in FIG. 9 with the region 678 entered at the resonance frequency of about 100 kilohertz, this error being compensated as described in said patent. The input impedance of the first stage (1-Q1) at the resonance frequency of about 100 kiolhertz is substantially greater than the impedance of winding (10) including its shunt resistor (120) and winding (11) at this frequency, so that the voltage at the input to stage (1--Q1) in the first figure of U.S. Pat. No. 3,596,008 (between the base electrode and gound) would exhibit a characteristic substantially increasing amplitude as a function of frequency up to the neighborhood of the resonance frequency of about 100 kilohertz (whien tested, (when example, by using a magnetic record tape moving at 120 inches per second with a constant flux signal recorded thereon at suitable different recorded wavelengths).

As described in U.S. Pat. No. 3,596,008, the windings (10) and (11) are connected in series aiding relation with respect to frequencies below the resonance frequency of about 100 kilohertz of winding (10). because of the presence of shunt resistor (120) across winding (10), the wnding (11) effectively exhibits its own resonance frequency in conjunction with its shunt capacitance, and this higher resonance frequency is preferably near the upper end of the bandwidth, for example in the neighborhood of two megacycles per second. At this higher resonance frequency the impedance of the winding (11) is comparable to the input impedance of the input stage (1–Q1). The term "comparable" is used in this context to means approximately equal within a factor of about tow, (that is from about 50% of the input impedance of the input stage to about twice the input impedance thereof).

In each of the embodiments hereof the playback winding means, whether consisting of only a single winding (Ser. No. 649,256, page 53), two winding of equal number of turns in series aiding relation (as windings 23 and 24 of FIGS. 2–5 hereof), or unequal turn windings in series aiding or series opposing relation with or without a resistor shunting the high turns winding alone, has a resonance frequency at the mid region of the essential frequency band of the system. The term "mid band frequency range" refers to frequencies at least two octaves below the essential upper frequency limit of the bandwidth of the system. As explained in my copending application Ser. No. 156,287 filed June 24, 1971 (attorney's Case No. 68,203), the bandwidth of an offset carrier transducer system may extend from 0.1 megahertz to two megahertz, in which case a frequency above 0.1 megahertz and less than 0.5 megahertz, would be considered within the mid band frequency range. The essentially frequency components extend over many octaves (more than four octaves).

In each of the embodiments, the resonance of the playback winding means is effectively utilized to enhance playback response by providing a playback amplifier whose input impedance is such that the amplifier input stage receives an increasing head output in the re gion of the mid band resonance of the winding means, the head output in the region of th emid band resonance of the winding means, the head output as shown in FIG. 8B rising at a substantial rate as for example six decibles per octave with increasing frequency in the range of frequencies below the winding means resonance frequency.

The ratio of winding turns for unequal turn windings in series is between about three-to-one and about six-to-one. Preferably the higher turns winding has a shunt resistor thereacross with a resistance value lower than the input impedance of the playback amplifier at the resonance frequency of the higher turns winding but comparable to or greater than the head overall impedance at frequencies other than those in the neighborhood of resonance where the head overall impedance may rise substantially because of the effect of shunt capacitance.

In each of the embodiments, the playback head preferably provides an equivalent source resistance substantially equal to that providing a minimum noise-figure for the playback amplifier at frequencies above the resonance frequency of thee winding means, so that the playback amplifier is "matched" to the playback head with respect to minimum noise.

The preferred systems referred to in this section provide a relatively high signal to noise ratio over the bandwidth of the system, enabling the use of less amplification and or narrower record tracks and/or shorter scanning gaps (with consequent higher packing densities).

My U.S. Pat. No. 3,531,600 discloses in the thirteenth figure thereof a video playback amplifier with an input impedance of 36,000 ohms at 100 kilohertz and 26,000 ohms at one megahertz. The playback winding means has a mid band resonance frequency of about 250 kilohertz.

It is considered that heads with windings of 200 turns and 1,000 turns used with the heads of my U.S. Pat. Nos. 3,495,046 and 3,469,037 would have characteristics generally corresponding to the following typical characteristics for a head made in April of 1964:

| Winding | No. of Turns | Inductance at one kilohertz (Microhenries) | Resistance (ohms) | Q at one kilohertz |
|---|---|---|---|---|
| A | 200 | 860 | 4.9 | 1.0 |
| B | 1000 | 28,000 | 49 | 2.7 |
| A+B (aiding) | — | 33,700 | (53.9) | 2.95 |
| A+B (opposing) | — | 23,000 | (53.9) | 2.2 |

By way of comparison, U.S. Pat. No. 3,495,046 at column 14 describes a 200 turn winding of No. 40 AWG wire with an inductance of approximately 1,000 microhenries, and a 1,000 turn winding of No. 44 AWG wire with an inductance of approximately 25,000 microhenries.

The circuit of FIG. 10 thereof has an input stage generally comparable to that of the thirteenth figure of my U.S. Pat. No. 3,531,600, that is with optimum impedance matching using a boot-strap amplifier with an input impedance of about 36,000 ohms at 100 kilohertz and about 26,000 ohms at one megahertz. By comparison the head inductive reactance for an inductance of 25 millihenries at a mid band resonance of 250 kiolhertz would be of the order of $(2\pi)$ (250) $(10^3)$ (25) $(10^{-3})$ or about 40,000 ohms. For a frequency of one megahertz a head having an inductance of about one millihenry (the inductance of winding (28) of U.S. Pat. No. 3,495,046) would have an inductive reactance of about 6,300 ohms. Thus the input impedance of the amplifier is high enough in relation to head impedance so the head output voltage exhibits a rising response as shown in FIG. 8B in the region below mid band resonance.

In my U.S. Pat. No. 3,469,037 and 3,495,046 the use of series opposing windings is disclosed for playback, so that at the low end of the bandwidth of the system the output winding means has an operative or effective number of turns of 800, that is an operative number of turns in the range from about 500 to about 1,000 turns. The operative number of turns for a series opposing connection is obtained by subtracting the number of turns of the low turns winding (28), 200 turns, from the number of turns of the high turns winding (27), 1,000 turns.

In my U.S. Pat. No. 3,531,600 the operative number of turns at the low end of the bandwidth is about 1,000 turns.

In my U.S. Pat. Nos. 3,534,177 and 3,596,008 the operative number of turns at the low end of the bandwidth is 300 for a series opposing connection and 600 for a series aiding connection, for example. U.S. Pat. No. 3,534,177 also discloses a single winding head replacing a head with series aiding winding connections.

The term "head impedance" or "impedance of the output winding means" is used herein for convenience of measurement to refer to the inductive reactance of the head at and below the mid band resonance frequency assuming that the inductance measured at one kilohertz is constant, this definition being applicable only when any shunt resistance across the high turns winding is at least ⅓ of such additive reactance. For simplicity, this definition does not include a consideration of high frequency core losses nor any resistive paths of substantial magnitude in comparison to inductive reeacctance, or capacitive shunt paths across the windings prior to the amplifier series input capacitance. While the capativie shunt paths may result in a peak in the total impedance exhibited by the head at the midband resonance frequency, the effect of this peak value is preferably avoided as indicated at C1 in FIG. 8B by the provision of a shunt resistance of substantial magnitude as referred to above, across all or part of the head winding means, for example as indicated by the snut resistor (120) in the firt figure of U.S. Pat. No. 3,596,008. Above mid band resonance, there is a cross over point where the inductive reactnace of the low turns winding of a head with plural unequal turn windings excees the total impedance of the high turns winding together with its resistive and capacitive shunt paths. Thushead impedance above the mid band resonance frequency, for an unequal turn head as shown in the first figure of U.S. Pat. No. 3,596,008, is defined as the value of the inductive reactance of the low turns winding.

Taking inductance values of 4,800 microhenries and 670 microhenries for the windings (10) and (11) of the first figure of U.S. Pat. No. 3,596,008, the head impedance would be about 3,000 ohms at mid band resonance (at 1200 kilohertz). It will be noted that the shunt resistance (120) of this head has a value of about 1,800 ohms so that the shunt resistance is at least comparable to the head impedance at the mid band resonance frequency, that is the shunt resistance is 50 percent of the head impedance, or greater. As previously indicated since the shunt resistance is at least one-third of the inductive reactance of the high turns winding, the value of the shunt resistance is ignored in determining the value of "head impedance." At a higher resonance frequency such as two megahertz, the head impedance is taken as the inductive reactance of the low turns winding, that is about 8,400 ohms. At its resonance frequency, the inductive reactance of the low turns winding (about 8,400 ohms) is at least comparable to the input impedance of the amplifier.

The term "true series circuit" is utilized herein to refer to the connection of higher turns and lower turns windings in series at a given frequency without an effective by-pass circuit (such as would be provided by an inductor of lower resistance and reactance in parallel with the higher turns winding with respect to low frequencies).

I claim as my invention:

1. A video transducer system for the transmission of video intelligence comprising: a magnetic transducer head having output winding means resonant at a mid band resonance frequency, said head having coupling means for coupling to a magnetic record medium to receive input frequency components both above and below said mid band resonance frequency and producing at the output winding means corresponding output frequency components having a substantial phase error therebetween in comparison to the relative phase of said input frequency components the input frequency components extending frequency component to the highest essential frequency component for transmission of the video intelligence extnding over many octaves, and signal translating means having an input coupled to said output winding means and having an input impedance at said mid band resonance frequency, said signal translating means having an output, and having a compensating circuit interposed between the input and output thereof to substantially equalize the shifts in phase produced between said head coupling means and said output over a substantial range of frequencies including frequency components below said mid band resonance frequency and frequency components above said mid band resonance frequency to essentailly compensate for such phase error over the wide bandwidth of the video intelligence being transmitted.

2. The transducer system of claim 1 with said winding means comprising two windings connected in a true series circuit with respect to the lowest frequencies of the bandwidth during playback operation, one of said windings predominating at said mid band resonance frequency of said winding means and the other of said windings predomonating at a higher resonance frequency of said winding means near the upper end of the bandwidth.

3. The transducer system of claim 1 with said output winding means comprising a higher turns winding and a lower turns winding, said windings having a turns ratio of about three-to-one.

4. The transducer system of claim 1 with said winding means comprising a pair of windings, means for connecting said windings in series during playback, and means for reducing head inductance during recording operation.

5. The transducer system of claim 1 whith said winding means comprising a higher turns winding and a lower turns winding, the higher turns winding having a shunt resistor connected thereacross with a resistance of substantial magnitude in comparison to the inductive reactance of the higher turns winding at said mid band resonance frequency.

6. The transducer system of claim 5 with said signal translating means comprising a playback amplifier having its input connected to said widings in series aiding relation, said shunt resistor having a resistor value lower than the input impedance of the playback amplifier at the mid band resonance frequency but of a substantial magnitude in comparison to the inductive reactance of the higher turns winding.

7. The transducer system of claim 1 with said winding means comprising windings connected in a true series circuit and in aiding relation with respect to frequencies below said mid band resonance frequency during playback operation.

8. The transducer system of claim 7 with said winding means conprising windings with differnt resonant frequencies, and having a turns ratio of about three-to-one.

9. The transducer system of claim 1 wherein said winding means comprising a pair of windings, means for effectively energizing only one of said windings during recording, and means for connecting said windings in series during playback with a resistor opeatively connected across the one of said windings.

10. The transducer system of claim 9 with said windings having a turns ratio of about three-to-one, and said resistor being connected across the windings with the higher number of turns and having a resistance compatable to the inductive reactance of the higher turns winding at the mid band resonance frequency, the other lower turns winding being used during recording.

11. A video playback system operable over a wide bandwidth comprising a playback head having output winidng means resonant at a mid band resonance frequency, said output winding means having said mid band resonance frequency located at a mid band frequency at least two octaves below the highest essential frequency component of said wide bandwidth, said head having input means for receiving input frequency components both above and below said mid band resonance frequency, and producing at the output winding means corresponding output frequency components, and signal translating means having an input coupled to said output winding means for receiving said corresponding output frequency components therefrom, having an output, and having a compensating circuit interposed between the input and output thereof for tending to equalize the shifts in phase introduced between said head input means and said output between frequency components below said mid band resonance frequency and frequency components above said mid band resonance frequency, and being operable to supply output frequency components of effective amplitude at frequencies at least two octaves above said mid band resonance frequency.

12. The playback system of claim 11 with said winding means comprising two wndings connected in true series circuit and having a turns ratio of about five-to-one.

13. The playback system of claim 11 with said winding means comprising windings with different resonance frequencies, one resonance at said mid band resonance frequency and the other at a higher resonance frequency, such that the ratio of the resonance frequencies is in the range from five-to-one to ten-to-one.

14. The playback system of claim 11 with said winding means comprising a lower turns winding and a higher turns winding, means for effectively energizing only the lower turns winding during recording, and for connecting said windings in series during playback with a resistor of at least about 3000 ohms connected across azid higher turns winding.

15. The playback system of claim 11 with said winding means comprising a pair of windings, means for connecting said windings in series during playback, andmeans for reducing head inductance during recording operation.

16. The playback system of claim 15 with means for connecting the windings in parallel during recording operation.

17. A video playback system comprising a playback head having output winding means resonant at a mid band resonance frequency, said head having input means for recieving input frequency components both above and below said mid band resonance frequency, and producing at the output winding means corresponding output frequency components, and signal translating means having an input coupled to said output winding means for receiving said corresponding output frequency components therefrom, having an output, and having a compensating circuit interposed between the input and output therof for tending to equalize the shifts in phase introduced between said head input mean and said output between frequency components below said mid band resonance frequency and frequency components above said mid band resonance frequency, said output winding means having said mid band resonance frequency located at a mid band frequency at least two octaves below the highest essential frequency component of the bandwidth of said system and having an operative number of turns in the range from about five hundred turns to about one thousand turns operative at the low end of the bandwidth to provide a substantial output amplitude at frequencies at the low end of said bandwidth.

* * * * *